US012644985B2

(12) United States Patent
Baum et al.

(10) Patent No.: US 12,644,985 B2
(45) Date of Patent: Jun. 2, 2026

(54) SYSTEM AND TECHNIQUES FOR IMPROVING IN-ROOM PERSON DETECTION

(71) Applicant: APPLE INC., Cupertino, CA (US)

(72) Inventors: Barak Baum, Herzliya (IL); Yoav Feinmesser, Herzliya (IL); Naftali Sommer, Herzliya (IL)

(73) Assignee: APPLE INC., Cupertino, CA (US)

( * ) Notice: Subject to any disclaimer, the term of this patent is extended or adjusted under 35 U.S.C. 154(b) by 590 days.

(21) Appl. No.: 18/140,517

(22) Filed: Apr. 27, 2023

(65) Prior Publication Data

US 2023/0400574 A1     Dec. 14, 2023

Related U.S. Application Data

(60) Provisional application No. 63/366,291, filed on Jun. 13, 2022.

(51) Int. Cl.
| | |
|---|---|
| *G01S 17/04* | (2020.01) |
| *G01S 7/52* | (2006.01) |
| *G01S 15/04* | (2006.01) |
| *G01S 17/48* | (2006.01) |
| *G01S 17/87* | (2020.01) |

(52) U.S. Cl.
CPC .......... *G01S 17/04* (2020.01); *G01S 7/52004* (2013.01); *G01S 15/04* (2013.01); *G01S 17/48* (2013.01); *G01S 17/87* (2013.01)

(58) Field of Classification Search
CPC ...... G01S 17/04; G01S 7/52004; G01S 15/04; G01S 17/48; G01S 17/87; G01S 13/862; G01S 13/865; G01S 13/867; G01S 15/58; G01S 13/04
See application file for complete search history.

(56) References Cited

U.S. PATENT DOCUMENTS

| | | | | |
|---|---|---|---|---|
| 2010/0063736 | A1* | 3/2010 | Hoetzer ................ | B60W 30/09 |
| | | | | 701/301 |
| 2018/0100667 | A1* | 4/2018 | Komae .................... | F24F 11/89 |
| 2023/0373092 | A1* | 11/2023 | Zoghlami ............... | G01S 13/42 |

* cited by examiner

*Primary Examiner* — Michael E Teitelbaum

(74) *Attorney, Agent, or Firm* — Kilpatrick Townsend & Stockton LLP

(57) ABSTRACT

A technique for determining a presence of a person in a room may include an electronic device transmitting an electromagnetic wireless signal of a first sensor. The technique may include receiving an electromagnetic return signal from the electromagnetic wireless signal. The technique may include detecting a potential target in the room based on the electromagnetic return signal. The technique may include determining that the potential target is in the room using a second sensor. Responsive to determining the potential target is in the room, the technique may include saving a training signature of the electromagnetic return signal for training a machine learning model. This technique can be repeated to obtain a set of training signatures corresponding to potential targets. The technique may include training, using the set of training signatures, the machine learning model to detect when a target is in the room using the first sensor.

20 Claims, 10 Drawing Sheets

FIG. 5

TRANSMITTING AN ELECTROMAGNETIC WIRELESS SIGNAL BY AN ELECTROMAGNETIC TRANSCEIVER OF THE ELECTRONIC DEVICE

605

RECEIVING, BY THE ELECTROMAGNETIC TRANSCEIVER, AN ELECTROMAGNETIC SIGNAL RETURN FROM THE ELECTROMAGNETIC WIRELESS SIGNAL

610

DETECTING A POTENTIAL MOBILE TARGET IN THE ROOM BASED ON THE ELECTROMAGNETIC SIGNAL RETURN

615

RESPONSIVE TO DETECTING THE POTENTIAL MOBILE TARGET, TRANSMITTING AN ULTRASONIC SIGNAL FROM A TRANSMITTER OF THE ELECTRONIC DEVICE

620

RECEIVING AN ULTRASONIC SIGNAL RETURN BY A RECEIVER OF THE ELECTRONIC DEVICE

625

CONFIRMING THE POTENTIAL MOBILE TARGET IS IN THE ROOM BASED ON THE ULTRASONIC SIGNAL RETURN

630

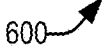
600

FIG. 6

Figure 7:
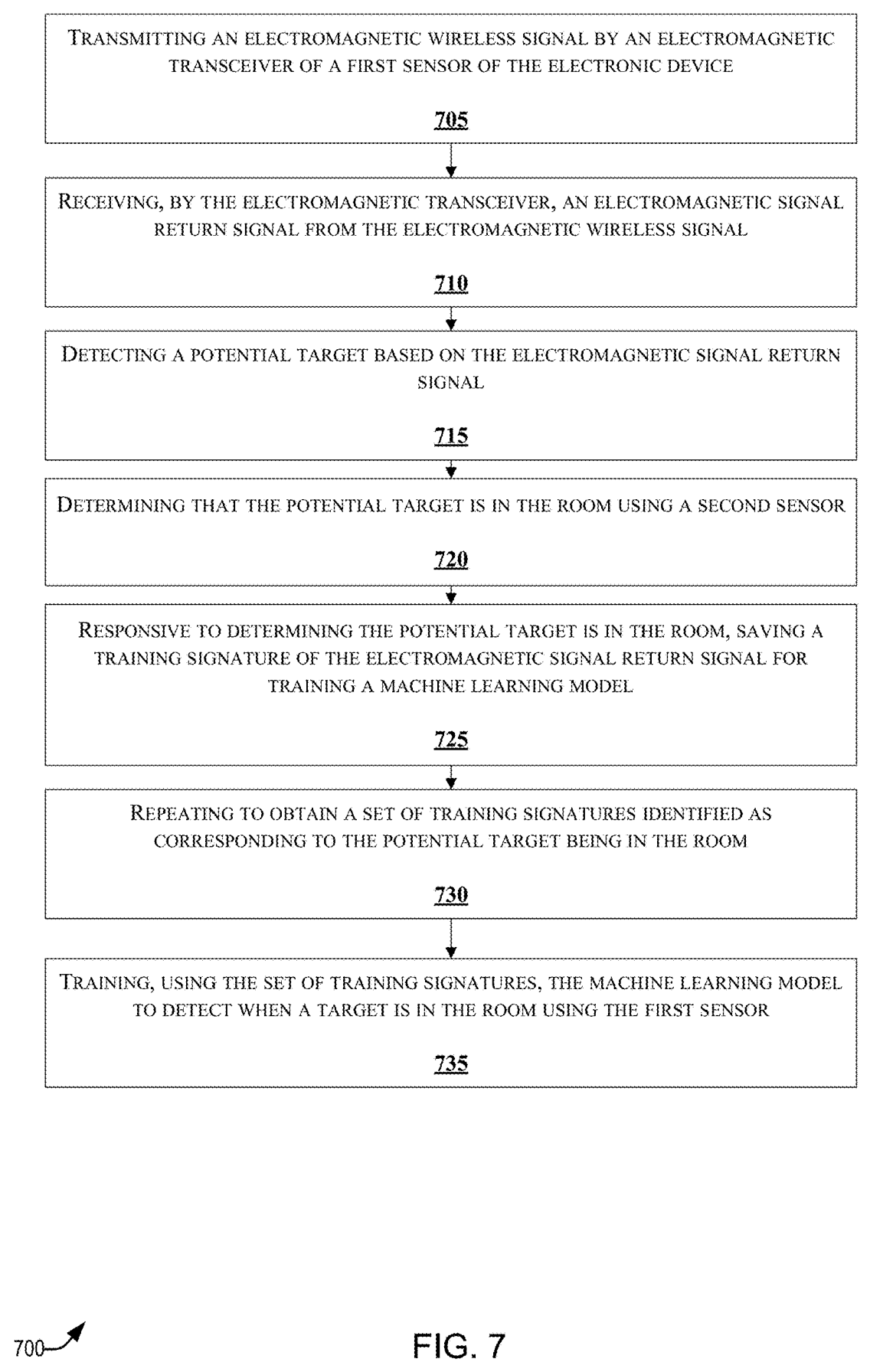

TRANSMITTING AN ELECTROMAGNETIC WIRELESS SIGNAL BY AN ELECTROMAGNETIC TRANSCEIVER OF A FIRST SENSOR OF THE ELECTRONIC DEVICE

705

RECEIVING, BY THE ELECTROMAGNETIC TRANSCEIVER, AN ELECTROMAGNETIC SIGNAL RETURN SIGNAL FROM THE ELECTROMAGNETIC WIRELESS SIGNAL

710

DETECTING A POTENTIAL TARGET BASED ON THE ELECTROMAGNETIC SIGNAL RETURN SIGNAL

715

DETERMINING THAT THE POTENTIAL TARGET IS IN THE ROOM USING A SECOND SENSOR

720

RESPONSIVE TO DETERMINING THE POTENTIAL TARGET IS IN THE ROOM, SAVING A TRAINING SIGNATURE OF THE ELECTROMAGNETIC SIGNAL RETURN SIGNAL FOR TRAINING A MACHINE LEARNING MODEL

725

REPEATING TO OBTAIN A SET OF TRAINING SIGNATURES IDENTIFIED AS CORRESPONDING TO THE POTENTIAL TARGET BEING IN THE ROOM

730

TRAINING, USING THE SET OF TRAINING SIGNATURES, THE MACHINE LEARNING MODEL TO DETECT WHEN A TARGET IS IN THE ROOM USING THE FIRST SENSOR

SYSTEM AND TECHNIQUES FOR IMPROVING IN-ROOM PERSON DETECTION

CROSS-REFERENCES TO RELATED APPLICATIONS

This application claims the benefit to U.S. Provisional Application No. 63/366,291, filed Jun. 13, 2022, entitled "System And Techniques For Improving In-Room Person Detection," the disclosures which is incorporated by reference in its entirety and for all purposes.

BACKGROUND

Home automation systems can be used to detect the presence or absence of persons in various rooms of a home. The home automation system may attempt to discover if a person is in a particular room using one or more sensors. For example, if a person is in a room, the home automation system can turn on or off lights, adjust the heating or air conditioning, or enable various electronic systems located in the room. However, providing high accuracy in a manner that is not obtrusive to occupants can be difficult.

BRIEF SUMMARY

Certain embodiments of the present disclosure can provide methods, systems, and apparatuses for improving in-room person detection. A combination of wireless electromagnetic signals and ultrasonic radar (sonar) can be used to identify whether or not a potential target is inside or outside of the room. For example, if a target is identified via a return of wireless electromagnetic signal but is not detected using the ultrasonic radar (sonar), the target may be located outside the room. Ideally the use of ultrasonic radar (sonar) could be minimized by using it as a confirmation sensor as opposed to a primary sensor. Other sensors can also be used as confirmation sensors. Electronic devices can often incorporate one or more microphones and one or more speakers that can provide the sonar signal that can provide increased coverage for the room.

In some embodiments, the electronic device can save a training signature of the electromagnetic signal returns for training a machine learning model. The electronic device can repeat the process to obtain a set of training signatures identified as corresponding to the potential target being in the room. In that way, the electronic device can train, using the set of training signatures, the machine learning model to detect when a target is in the room using the first sensor. In some embodiments, the training signature can include cases when no target is in the room. In some embodiments, the training signature can include cases where the target is outside of the room. Based on all these types of cases, the machine learning model can learn the correct decision rule.

In one general aspect, a method may include transmitting an electromagnetic wireless signal by an electromagnetic transceiver of the electronic device. The method may include receiving, by the electromagnetic transceiver, an electromagnetic signal return from the electromagnetic wireless signal. The method may include detecting a potential mobile target in the room based on the electromagnetic signal return. Responsive to detecting the potential mobile target, the method may include transmitting an ultrasonic signal from a transmitter of the electronic device. The method may include receiving an ultrasonic signal return by a receiver of the electronic device. The method may include confirming the potential mobile target is in the room based on the ultrasonic signal return. Other embodiments of this aspect include corresponding computer systems, apparatus, and computer programs recorded on one or more computer storage devices, each configured to perform the actions of the methods.

Implementations may include one or more of the following features. The method of detecting the potential mobile target may include storing a transmission time of the electromagnetic wireless signal. The method may include storing a reception time of the electromagnetic wireless signal. The method may include calculating a time of flight based on the transmission time and the reception time. The method may include calculating a distance of the potential mobile target based on the time of flight. The method may include comparing the distance based on a library of stored distances for the room. The method may include confirming the potential mobile target is outside the room if the distance is outside one or more stored ranges for the room. In various embodiments, the transmitter is a speaker of the electronic device, and the receiver of the electronic device is a microphone. In various embodiments, the electromagnetic wireless signal is an ultrawideband signal. In various embodiments, the detecting the potential mobile target may include determining a doppler shift of the electromagnetic signal return to determine motion of the potential mobile target. In various embodiments, the method may include detecting the potential mobile target using a passive sensor. Implementations of the described techniques may include hardware, a method or process, or a computer tangible medium.

In one general aspect, a method may include transmitting an electromagnetic wireless signal by an electromagnetic transceiver of a first sensor of the electronic device. The method may include receiving, by the electromagnetic transceiver, an electromagnetic return signal from the electromagnetic wireless signal. The method may include detecting a potential target in the room based on the electromagnetic return signal. The method may include determining that the potential target is in the room using a second sensor. Responsive to determining the potential target is in the room, the method may include saving a training signature of the electromagnetic return signal for training a machine learning model. The method may include repeating to obtain a set of training signatures identified as corresponding to the potential target being in the room. The method may include training, using the set of training signatures, the machine learning model to detect when a target is in the room using the first sensor. Other embodiments of this aspect include corresponding computer systems, apparatus, and computer programs recorded on one or more computer storage devices, each configured to perform the actions of the methods. In some embodiments, the training signature can include cases when no target is in the room. In some embodiments, the training signature can include cases where the target is outside of the room. Based on all these types of cases, the machine learning model can learn the correct decision rule.

Implementations may include one or more of the following features. In various embodiments, a second signal from the second sensor may include an ultrasonic signal and the second sensor may include a microphone. In various embodiments, a second signal from the second sensor may include an infrared signal and the second sensor may include an infrared sensor. In various embodiments, the second sensor may include a camera. The method can include generating a model of the room by exposing the electronic device to one or more known targets. The method can include training the model of the room to identify the one or more known targets. The method can include storing the model of the room in a memory. The method can include identifying a potential known target from the one or more known targets based on one or more characteristics of the electromagnetic signal return and one or more characteristics of a second signal from the second sensor. In various embodiments, the second sensor is initially used for calibrating the model of the room to identify the one or more known targets. The method can include receiving an identifier in a wireless signal from a second electronic device associated with the one or more known targets. The method can include determining angular information for the one or more known targets from the second sensor. The method can include using the angular information to identify a potential known target from the one or more known targets. Implementations of the described techniques may include hardware, a method or process, or a computer tangible medium.

In another aspect, an electronic device in a room can transmit an electromagnetic wireless signal by an electromagnetic transceiver of a first sensor of the electronic device. The electronic device can receive, by the electromagnetic transceiver, an electromagnetic return signal from the electromagnetic wireless signal. The electronic device can detect a potential target in the room based on the electromagnetic return signal. The electronic device can determine that the potential target is in the room using a second sensor. Responsive to determining the potential target is in the room, the electronic device can save a training signature of the electromagnetic return signal for training a machine learning model. The electronic device can repeat the process to obtain a set of training signatures identified as corresponding to the potential target being in the room. The electronic device can train, using the set of training signatures, the machine learning model to detect when a target is in the room using the first sensor. In some embodiments, the training signature can include cases when no target is in the room. In some embodiments, the training signature can include cases where the target is outside of the room. Based on all these types of cases, the machine learning model can learn the correct decision rule.

A second sensor (e.g., infrared, cameras) can be used to train a model of the room to detect and possibly identify particular targets in a room. In various embodiments, the sonar can be discontinued when the model achieves a threshold prediction rate. Other wireless signals from electronic devices (e.g., a smart phone, a smart watch, wireless earbuds) can be used to detect and possibly classify the one or more targets in a room.

Other embodiments of the invention are directed to systems, apparatus, and computer readable media associated with methods described herein. In one embodiment, the computer readable medium contains instructions for receiving data and analyzing data, but not instructions for directing a machine to create the data. In another embodiment, the computer readable medium does contain instructions for directing a machine to create the data. In one embodiment, a computer program product comprises a computer readable medium storing a plurality of instructions for controlling a processor to perform an operation for methods described herein. Embodiments are also directed to computer systems configured to perform the steps of any of the methods described herein, potentially with different components performing a respective step or a respective group of steps.

Reference to the remaining portions of the specification, including the drawings and claims, will realize other features and advantages of embodiments of the present invention.

Further features and advantages, as well as the structure and operation of various embodiments of the present invention, are described in detail below with respect to the accompanying drawings. In the drawings, like reference numbers can indicate identical or functionally similar elements.

BRIEF DESCRIPTION OF THE DRAWINGS

FIG. 5 illustrates a communication technique for determining an angle of arrival.

FIG. 6 illustrates a sequence diagram involving a first electronic device and a mobile device with a multiple-antenna array.

FIG. 7 illustrates a flowchart illustrating a first exemplary technique for detecting a person in a room.

DETAILED DESCRIPTION

Certain embodiments of the present disclosure can provide methods, systems, and apparatuses for improving in-room person detection. A combination of wireless electromagnetic signals and ultrasonic radar (sonar) can be used to identify whether or not a potential target is inside or outside of the room. For example, if a target is identified via a return of wireless electromagnetic signal but is not detected using the ultrasonic radar (sonar), the target may be located outside the room. Ideally the use of ultrasonic radar (sonar) could be minimized by using it as a confirmation sensor as opposed to a primary sensor. Other sensors can also be used as confirmation sensors. Electronic devices can often incorporate one or more microphones and one or more speakers that can provide the sonar signal that can provide increased coverage for the room.

Wireless electromagnetic signals can be used to detect, localize, and classify targets in the room. However, in some circumstances, the wireless signals can pass through walls and detect targets outside the room, resulting in false positives for in-room detection. Ultrasonic radar (sonar) does not penetrate solid surfaces and can be used to locate targets in the room, but sonar can be limited in range and can be detected by household pets.

In various embodiments, the electronic device can save a training signature of the electromagnetic signal returns when a target is detected for training a machine learning model. The electronic device castore a set of training signatures identified as corresponding to the potential target being in the room for training a model to detect the person just using the electromagnetic signal returns from the first sensor. In some embodiments, the training signature can include cases when no target is in the room. In some embodiments, the training signature can include cases where the target is outside of the room. Based on all these types of cases, the machine learning model can learn the correct decision rule.

I. Detecting a Person in a Room

Figure 1:
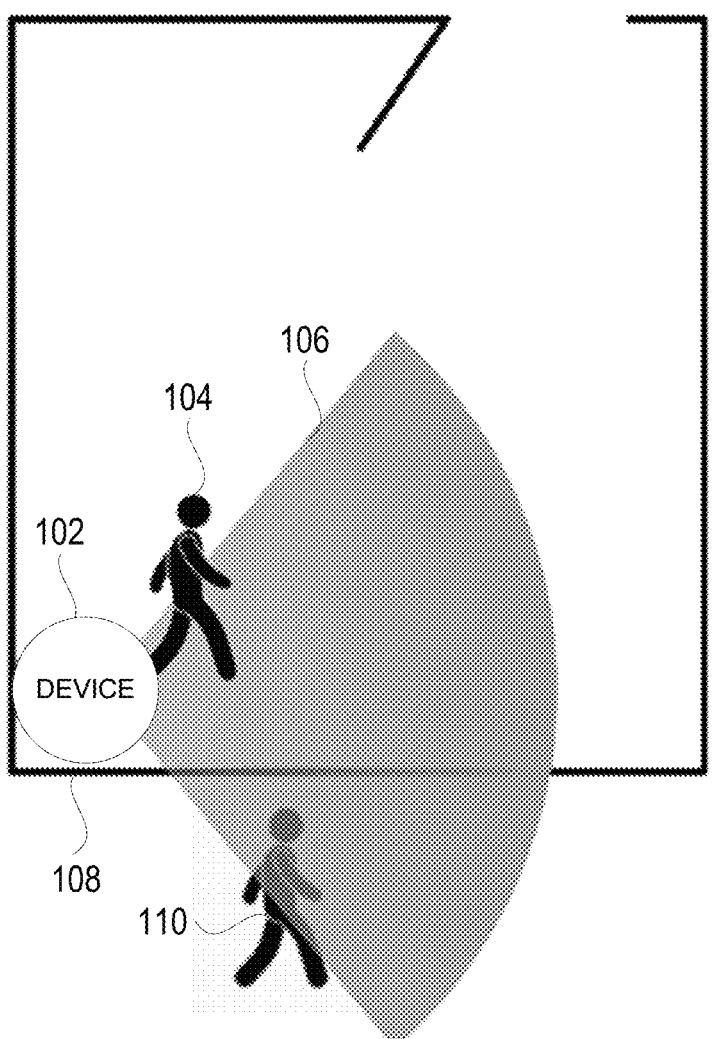
FIG. 1 illustrates an exemplary room in a residence for detecting a presence of a person in a room according to aspects of the present disclosure.

FIG. 1 illustrates an exemplary room 100 in a residence for detecting a presence of a person (P1) 104 in a room 100 according to aspects of the present disclosure. One or more electronic devices 102 can be distributed throughout a room 100. The electronic device 102 can include a smart speaker (e.g., a HomePod), a laptop computer (e.g., MacBook, Airbook), a smartphone (e.g., an iPhone), or a tablet computer (e.g., an iPad). The electronic device 102 can include a radar system and/or a sonar system. In various embodiments, the electronic device 102 can be located at fixed points in a room 100. Electronic devices 102 can emit one or more signals 106 (e.g., an electromagnetic signal or an ultrasonic signal). The electronic device 102 can also receive a return the one or more signals.

The electronic device 102 can use the one or more signal returns to determine presence information for the room 100. The presence information can be used by a home network system (e.g., HomeKit) to turn on or off the lights in the room, adjust a temperature in the room, or provide suggestions for streaming content to the person 104 in the room.

A. Detecting Presence in the Room

In various embodiments, the electronic device 102 can determine whether or not a person 104 is present in the room 100 based on the return from the one or more signals. The electronic device 102 can also determine how many people are in the room 100.

To detect a person, the electronic device 102 can learn a pattern the room 100 when it is not occupied (e.g., no persons in the room). The electronic device 102 can detect differences between signal returns for the unoccupied room and signal returns for the room 100 that is occupied by one or more persons. For example, the signal returns can be clustered based on signal values, so as to differentiate between the two scenarios.

In addition or alternatively, measurements over time can be used, as opposed to just a single snapshot in time. For example, the electronic device 102 can detect changing of patterns of the signal returns, e.g., where the changes are larger than typical noise. A total change can be determined, with a certain threshold required for the change, so as to differentiate from typical variation due to noise.

The return signals can be converted to a point-cloud. For example, three dimensional (3D) point clouds can be representative of an environment based on two dimensional (2D) radar measurements of the environment. A radar system may initially receive measurements of a nearby environment using a radar unit configured with a staggered linear array of antennas. By processing the incoming measurements, the radar system may determine a 3D representation of the measured environment that includes elevation information regarding objects and other surfaces positioned in the environment. The point-cloud can be stored in a memory of the electronic device.

B. Differentiating Among Users

In various embodiments, the electronic device 102 can determine who is the person 104 in the room 100. For example, in a house there may be 4-5 people that can be reasonably determined to be in the room 100 on a regular basis. The reflective targets from the one or more signals 106 can be distinct enough that the system can determine an identification of a specific person 104 in the room 100. The electronic device 102 can learn over time the identification of various return signals (also referred to as "returns").

For example, the electronic device 102 can learn from the one or more returns over time. The electronic device 102 may not necessarily know a particular identity. The electronic device 102 may just learn that it has seen a particular reflection pattern before, and it generally corresponds to a particular person. In some cases, electronic device 102 may determine that the reflection patterns are similar and then detect the present of a different reflection pattern. The electronic device 102 may be able to determine that three or four reflection patterns are similar, and when the electronic device 102 sees those patterns again it can identify it as person A even if it does not know specifically the identity of person A.

In this manner, the electronic device 102 can be trained using unsupervised learning to cluster the patterns to differentiate among the people. As the electronic device 102 can be in a home or a business the number of people with access to the room 100 will be limited. The electronic device 102 can learn return pattern of the basic layout of the room 100 and subtract this base line pattern from a new return pattern measured. This difference can be clustered to identify different people.

The electronic device 102 can use other sensors as well to aid in the learning process (e.g., the use of a camera such as an Internet Protocol (IP) camera). The electronic device 102 can use the images captured on the camera and associate the images with known users using image analysis techniques and comparison with a library of known users. The electronic device 102 can associate the distinct electromagnetic returns to certain users after the electromagnetic returns have been learned and stored. However, such uses of the camera can be limited by embodiments of the present disclosure.

In various embodiments, the electronic device 102 can be trained to detect individual persons based on the signal returns. The individual returns can be based on a size or a shape of the returns. Such differentiation can be between adults and children, and not necessarily between specific people. Clustering of signal values can be used in a similar way as for differentiating between an unoccupied room and an occupied room.

C. Use of Various Signals

The one or more signals 106 can be an electromagnetic wireless signal (e.g., ultrawideband signal (UWB). An electromagnetic signal (e.g., UWB) can detect targets at a distance (e.g., around 9-10 meters from the electronic device). An advantage of electromagnetic signals is that they generally cannot be detected by humans or common household pets. An electromagnetic signal can attenuate as it passes through a wall 108 or other solid objects. The attenuation can vary according to the wall type. For example, a brick or concrete wall will attenuate signals much more than wood or plaster or plasterboard walls. Under various conditions, a return for the person (P1) 104 inside the room 100 can have a similar return for a second person (P2) 110 that is outside the room 100. This may assume that a first distance from the electronic device 102 to the person (P1) 104 is similar to a second distance from the electronic device 102 to the second person (P2) 110. Therefore, a general classification using an electromagnetic signal alone can be complex.

When a target (e.g., a person (P1) 104) is further away from the electronic device 102, the electromagnetic signal has decreased energy and if a wall 108 is present in the way, it has increased probability for the electronic device will not detect the target. When the target (e.g., a person (P1) 104) is close, the returned electromagnetic signal is still strong, even if a wall is present, and the electronic device can easily detect the target. Therefore, when the target is far, the electronic device can have an increased probability to understand that the second person (P2) 110 is behind a wall compared to other closer targets (e.g., the person (P1) 104) due to the attenuation having a similar effect on the electromagnetic signal, but far targets have weaker signals in general. As an objective can be to detect if a person is in the room 100, it is desirable that the electronic device 102 avoid detection of targets in adjacent rooms (or adjacent houses, apartments, etc.).

In various embodiments, the electronic device can emit a wide beam (e.g., 120 degrees) for the electromagnetic signal. The use of wide beams can make many room geometries ambiguous.

The one or more signals can be an ultrasonic signal. Ultrasound signals can be a mechanical wave with a vibration frequency higher than 20 kilo Hertz (kHz). Ula has the characteristics of high frequency, short wavelength, small diffraction phenomenon, especially good directivity, which can become rays and propagate directionally. Ultrasonic signals can be used for presence detection. Ultrasonic signals do not penetrate solid surfaces (e.g., a wall 108) and the range can be more limited (as compared with electromagnetic signals). In various embodiments, the range of the ultrasonic signal can be around 6-7 meters. An ultrasonic signal can detect if a person is in the room, however due to the high frequency it can be detected by common household animals (e.g., cats and dogs) and it may scare them. In various embodiments, the ultrasonic signals can be emitting using one or more speakers and one or more microphones of an electronic device. However, these ultrasonic signals may interfere with the playing of music using the device.

Humans can detect sounds in a frequency range from about 20 Hz to 20 kHz. Ideally, the use of ultrasonic signals would be outside the detectable frequency range. If the same speaker is used for other audio features of an electronic device (e.g., playing music), it would be advantageous to transmit on frequencies around 21-22 KHz.

Higher ultrasonic frequency ranges (e.g., 40 kHz) can present fewer issues. If a dedicated sonar sensor is used there may be no problem to use high frequency and practically avoid these problems. Another motivation to reduce the usage of sonar is power consumption. The sonar systems can consumer higher power than electromagnetic radar which can be problematic for power limited battery systems.

While ultrasonic signals have many advantages, electromagnetic signals (e.g., UWB) perform much better in the case of occlusions in the room 100. For example, a high-profile sonar may be more sensitive to occlusions (e.g., furniture) in a room. Just as ultrasonic signals will not pass through a wall 108, ultrasonic signals will not pass-through objects in the room. Therefore, a combination approach of using electromagnetic signals and ultrasonic signals for presence detection can work than either electromagnetic signals or sonar signals on their own.

II. Improved Techniques Detecting a Person in a Room

In one aspect, a combination of one or more signals can be used to detect the presence of a person in a room. For example, electromagnetic signals and ultrasonic signals can be used to detect a person in the room. The combination of the electromagnetic signals and ultrasonic signals can overcome some of the challenges to using only electromagnetic signals or ultrasonic signals alone. For example, an electromagnetic signal can detect possible in-room event, which can trigger an ultrasonic signal, so that the ultrasonic signal is not always on. In addition, or alternatively, the ultrasonic signal can be used as a gold standard to label when an in-room event does occur, and then measurements using an electromagnetic signals (labeled as corresponding to an in-room event) can be used to train a supervised model.

Figure 2:
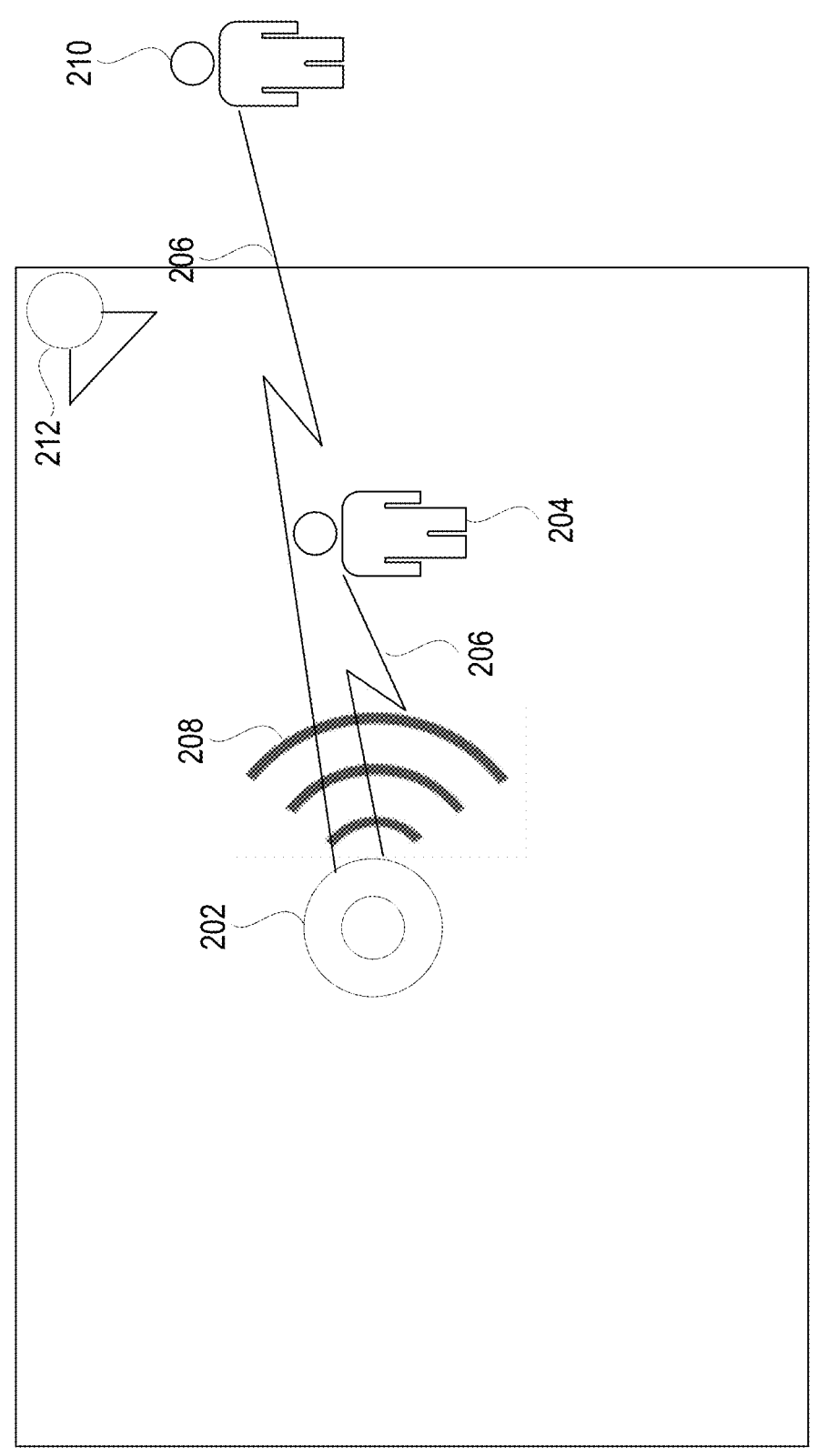
FIG. 2 illustrates an electronic device propagating multiple signals to detect a person in a room.

FIG. 2 illustrates an electronic device 202 using multiple signals to detect a person 204 in a room 200. In the example shown, the multiple signals can include an electromagnetic signal 206 and ultrasonic signal 208. In another example shown, the multiple signals are electromagnetic signal 206 and ambient light signals detected by a sensor 212, which may also be part of electronic device 202.

The techniques are not limited to a particular type of electromagnetic signal 206, however the frequency of the electromagnetic signal 206 will dictate the range for detecting targets. The electromagnetic signal 206 should be able to propagate a few meters and come back with enough energy to be detected. For example, Bluetooth, Wi-Fi, Bluetooth Low Energy, and UWB signals can be used as the protocol of the electromagnetic signal 206. The electronic device 202 can include a pulse radar that can transmit pulses and wait for the returns. Alternatively, the electronic device 202 can include a chirp radar that will generate a longer signal and look for a base range. Alternatively, a radio signal can be used if the radio signal propagates will the electronic device 202 can be able to determine a range of the target.

The electronic device 202 can include one or more antennas. In various embodiments, it may be difficult for a single antenna can provide up to 360-degree coverage of the room 200. However, the placement of the electronic device 202 in the room 200 will determine coverage for the room 200. In various embodiments, more than one antenna may be used to provide optimum coverage for the room 200. The electronic device 202 can be calibrated such that, if it knows the intensity of the electromagnetic signal that is transmitted and can determine the intensity of the electromagnetic signal return that it receives back, it can determine the distance to the target. In various embodiments, the range to the target will be determined based on the time delay from transmission of the signal until the reception of the return signal.

A. Use of EM Signals to Trigger Ultrasonic Measurement

In various embodiments, the electronic device 202 can transmit electromagnetic signals 206 (e.g., UWB signals) and ultrasonic signals 208. The returns from the electromagnetic signals 206 (e.g., UWB signals) and ultrasonic signals 208 can be used to determine a presence of a person 204 in a room 200. The electronic device 202 can include one or more speakers that can transmit the ultrasonic signal and one or more microphones that can be used to receive the signal returns. The electronic device 202 can filter the ultrasonic signal returns for making a detection. The electronic device 202 can also receive sonar energy from static objects in the room 200 (e.g., walls, furniture). In order to locate a person 204 in the room 200 that is moving, the electronic device 202 can process the ultrasonic signal returns to eliminate returns off static objects. For example, the electronic device 202 can generate a baseline pattern for the signal returns and then analyze various differences from the baseline pattern in subsequent returns to determine if there is a person 204 moving in the room 200.

In order to determine that the target is moving (using either electromagnetic signals 206 or ultrasonic signals 208) the electronic device 202 can detect a change in the range of the signal returns between subsequent transmissions. Pets moving in the room can create false positive detections. The electronic device 202 can employ mitigation strategies that can including analyzing the characteristics of the return signature (e.g., size of return or height of the returns) to differentiate between pets and humans in the room 200.

The electronic device 202 can receive a plurality of reflections of the electromagnetic signals 206 and ultrasonic signals 208 from objects and persons in the room 200 and reconstruct the data to determine if there is a moving object in the reflections. In various embodiments, the electronic device 202 can estimate the size of the moving object. In various embodiments, the electronic device 202 can estimate the speed of the moving object. In various embodiments, the one or more returns can be represented by a point cloud. The point cloud can be analyzed to determine if a person is moving in the room 200.

The electronic device 202 can also measure a distance based on the time delay between the transmission of an ultrasonic signal 208 and the time the return is received at the electronic device 202. In various embodiments, the ultrasonic signal 208 can be used for short range (e.g., 4-5 meters) and the electromagnetic signals 206 can be used for longer range. If walls are present in the short range, the ultrasonic signs will not detect targets (e.g., a second person) behind the wall. If walls are present at higher ranges (e.g., greater than 5 meters), the electromagnetic signal 206 will be much weaker behind the wall.

By using information on target range from the electromagnetic signals 206, the electronic device 202 can identify targets (e.g., a person 204) that are closer than other targets (e.g., a second person 210). For example, the electronic device 202 and reduce broadcast time or energy for closer targets. For example, the electronic device 202 can be tuned to identify targets at a predetermined range (e.g., 6 meters). In these cases, identifying targets at 2 meters would be easier than at longer ranges. By reducing the transmitting power of the electronic device 202 uses for the one or more signals that is used to detect persons inside the room 200, the nuisance to pets in the room 200 can be reduced and there can be less time or power that would be used to interfere with playing music on the electronic device 202.

In various embodiments, the electronic device 202 can increase a number of pulses or chirps produced for the one or more signals to achieve better detection rates using the same amount of energy.

If the electronic device 202 calculates that the target is further away, the electronic device 202 can increase the broadcast time and or broadcast energy to obtain a better detection at limits of the signal's effective range (e.g., sonar range can be more limited). By using information determined on target range (e.g., from electromagnetic signals 206) the electronic device 202 can use various filtering techniques and signal processing methods to look only at certain ranges or certain angles for better signal-to-noise ratio (SNR) results.

If angle information can be determined using the ultrasonic signals 208 (e.g., having multiple microphones dispersed around a surface of the electronic device 202), then the angle information can help confirm target detection using other signals (e.g., an electromagnetic signal 206). If room 200 topology is known, it can be used to determine whether or not a person 204 is located inside or outside the room. For example, if a room 200 is mapped such that furniture is at a certain location such that no persons could be in that specific location that information can be used by the electronic device 202 in determining whether or not a person 204 is in a room 200.

In various embodiments, if the returns from the electromagnetic signals 206 and the ultrasonic signals 208 detect a target, the logic of the electronic device 202 can determine that a person 204 is present in the room 200. If the electromagnetic signals 206 detect the presence of the person 204 in the room 200 but the ultrasonic signals 208 do not, it can mean that the electromagnetic signals 206 are detecting a second person 210 that is outside of the room 200. However, if the ultrasonic signals 208 detect the person 204 in the room 200, but the electromagnetic signals 206 do not, the logic for the electronic device 202 may determine that a person 204 is in the room 200. In various embodiments, the ultrasonic signal 208 transmission is limited to use after detection by the electromagnetic signals 206. In this way, the use of the ultrasonic signals 208 is minimized to reduce the issues that may be caused by its use.

In various embodiments, the electromagnetic signals 206 can have dead zones for detection in the room. The location and the size of dead zones can depend on number of antenna and antenna placement. In various embodiments, separate antennas can be displaced throughout the room.

In various embodiments, the electronic device 202 can reduce the transmission of ultrasonic signals 208 at some point or even cease the transmission completely. In various embodiments, the electronic device 202 can have a startup time of maybe two hours, maybe a day, maybe a few weeks, to transmit ultrasonic sonar 208 and then stops.

B. Training EM Model

It can be challenging to build a global model for all cases for a certain room geometry or because the returns from the one or more signals of the electronic device inside in one room looks like another person outside of a different room or in the same room. The presence detection logic can use information from other sensors to map known conditions. For example, the system can use a second sensor 212 (e.g., a camera, an ultrasonic sensor, an infrared sensor) as a ground truth generator or label generator. The electronic device 202 can build a model that is specific for certain cases that can be used to confirm detections from other sensors. The electronic device can generate a per-room or a very specific model that can be applicable only for the certain conditions. In order to understand if the person 204 is inside or outside of the room 200, the electronic device 202 can use information from a second sensor 212 for specific cases.

In various embodiments, the electronic device 202 can use the electromagnetic signals 206 to identify when the person is within range of the ultrasonic signals 208. The electromagnetic signals 206 can be used to conduct ranging of the target. When the target is within ultrasonic signal range, the electronic device 202 can transmit the ultrasonic signals 208. After confirmation of the target with the ultrasonic signals 208, the ultrasonic signals 208 can be reduced and only electromagnetic signals 206 can be used.

In various embodiments, the electronic device 202 can generate a global model for determining whether or not a person is inside or outside of the room 200. If the electronic device 202 determines there is a high probability or low probability of detection, then the electronic device 202 can active the ultrasonic signals 208. If the electronic device determines if there is little or no probability, then the electronic device 202 can activate the ultrasonic signals 208. Thus, the electronic device 202 can use the ultrasonic signals 208 only when the model of uncertainty is high. Even if this is true for global model, it can also be true for some people to learn onsite, on premises. The ultrasonic signals 208 can use it like a genie or someone who can tell where items or persons are located in the room and then build the model over time. The model can be improved and tested online. Therefore, there can be a period where the electronic device 202 is transmitting ultrasonic signals 208.

In various embodiments, the electronic device 202 can include multiple antennas. Various broadcast and reception schemes can be employed for sending and receiving electromagnetic signals 206. In various embodiments, the electronic device 202 can include pairs of transmitting and receiving antenna. In various embodiments, the transmission and reception from different antenna can be done simultaneously.

For reception of ultrasonic signals 208, there can be a vector of signals per delay between transmission and reception. The directional component of the vector can be determined using various microphones distributed around the electronic device 202.

C. Example Electromagnetic Protocols

The one or more electromagnetics signals 206 can be transmitted using a wireless protocol. The electromagnetic signals 206 can be transmitted via a transmitter or a transceiver. The electromagnetic signal returns can be received via one or more antenna. The electronic device can measure the time of flight between when the electromagnetic signals 206 are transmitted and the one or more returns are received. The time of flight can be used to determine a range. A brief description of the various protocols is described below.

1. Low Energy Protocols

A passive beacon can transmit a timing signal via a wireless protocol (e.g., Bluetooth Low Energy (BLE) advertising). One of the advantages of BLE is lower power consumption even when compared to other low power technologies. BLE achieves the optimized and low power consumption by keeping the radio off as much as possible and sending small amounts of data at low transfer speeds. Another advantage of BLE is that it is enabled in most smartphones in the market.

In the advertising state, a device sends out packets containing useful data for others to receive and process. The packets are sent at an interval defined as the Advertising Interval. The interval can be random or pseudo-random. There are 40 radio frequency channels in BLE, each separated by 2 MHz (center-to-center). Three of these channels are called the Primary Advertising Channels, while the remaining 37 channels are used for Secondary Advertisements and for data packet transfer during a connection. Advertisements can start with advertisement packets sent on the three Primary Advertising Channels (or a subset of these channels). This allows centrals to find the Advertising device (Peripheral or Broadcaster) and parse its advertising packets.

The central can then initiate a connection if the advertiser allows it (e.g., peripheral devices).

2. Ultra-Wideband Packet Transmissions

Ultra-Wide Band (UWB) transmissions are not continuous transmissions, so a receiving device looking to acquire the UWB transmission would either need knowledge of the start time of the transmission or would need to expend energy in a powered-on state listening until the device captures the impulse UWB signal. If the receiving device knows even an approximate time of transmission, the receiver can remain in a reduced-power or sleep mode until just prior to the transmission time. For UWB communications, it can be challenging the receiving device to know when the first packet is going to arrive.

A technique to propagate the UWB transmission times is to broadcast the transmission time information at a defined time after an advertisement signal using another wireless protocol, e.g., Bluetooth Low Energy (BLE) advertisement transmissions. Although examples may refer to Bluetooth, other wireless protocols may be used. BLE has 40 physical channels in the 2.4 GHz ISM band, each separated by 2 megahertz (MHz). Bluetooth defines two transmission types: data and advertising transmissions. As such, three of these 40 channels are dedicated to advertising and 37 dedicated to data. Advertising allows devices to broadcast information defining their intentions.

The UWB information packets can be structured to transmit at a specific time relative to the transmitting device's BLE advertisements. Accordingly, the receiving device can listen for the UWB packets at an expected time or during an expected time window around the expected time. The UWB packets can convey transmitting device information, deep links, and/or transmission time information. The receiver device can use the time in the BLE advertising message to determine when to listen for the next poll. The UWB packets can be transmitted in the UWB frequency range.

The wireless protocol used for ranging can have a narrower pulse (e.g., a narrower full width at half maximum (FWHM)) than a first wireless protocol (e.g., Bluetooth) used for initial authentication or communication of ranging settings. In some implementations, the ranging wireless protocol (e.g., UWB) can provide distance accuracy of 5 cm or better. In various embodiments, the frequency range can be between 3.1 to 10.6 Gigahertz (GHz). Multiple channels can be used, e.g., one channel at 6.5 GHz another channel at 8 GHz. Thus, in some instances, the ranging wireless protocol does not overlap with the frequency range of the first wireless protocol (e.g., 2.4 to 2.485 GHz).

The ranging wireless protocol can be specified by Institute of Electrical Electronics and Engineers (IEEE) 802.15.4, which is a type of UWB. Each pulse in a pulse based UWB system can occupy the entire UWB bandwidth (e.g., 500 MHz), thereby allowing the pulse to be localized in time (i.e., narrow width in time, e.g., 0.5 ns to a few nanoseconds). In terms of distance, pulses can be less than 60 cm wide for a 500 MHz-wide pulse and less than 23 cm for a 1.3 GHz-bandwidth pulse. Because the bandwidth is so wide and width in real space is so narrow, very precise time-of-flight measurements can be obtained.

Each one of ranging messages (also referred to as frames or packets) can include a sequence of pulses, which can represent information that is modulated. Each data symbol in a frame can be a sequence. The packets can have a preamble that includes header information, e.g., of a physical layer and a media access control (MAC) layer and may include a destination address. In some implementations, a packet frame can include a synchronization part and a start frame delimiter, which can line up timing.

A packet can include how security is configured and include encrypted information, e.g., an identifier of which antenna sent the packet. The encrypted information can be used for further authentication. However, for a ranging operation, the content of the data may not need to be determined. In some embodiments, a timestamp for a pulse of a particular piece of data can be used to track a difference between transmission and reception. Content (e.g., decrypted content) can be used to match pulses so that the correct differences in times can be computed. In some implementations, the encrypted information can include an indicator that authenticates which stage the message corresponds, e.g., ranging requests can correspond to stage 1 and ranging responses can correspond to stage 2. Such use of an indicator may be helpful when more than two devices are performing ranging operations in near each other.

The narrow pulses (e.g., ~one nanosecond width) can be used to accurately determine a distance. The high bandwidth (e.g., 500 MHz of spectrum) allows the narrow pulse and accurate location determination. A cross correlation of the pulses can provide a timing accuracy that is a small fraction of the width of a pulse, e.g., providing accuracy within hundreds or tens of picoseconds, which provides a sub-meter level of ranging accuracy. The pulses can represent a ranging waveform of plus 1's and minus 1's in some pattern that is recognized by a receiver. The distance measurement can use a round trip time measurement, also referred to as a time-of-flight measurement. As described above, the mobile device can send a set of timestamps, which can remove a necessity of clock synchronization between the two devices.

III. Ranging Techniques

Electromagnetic signals can provide a non-intrusive way to detect the presence of a person in a room. Electromagnetic signals can be used to conduct ranging to determine a distance of a target from the device. The range information can be used to determine if the target is within detection range of other sensors (e.g., ultrasonic signals). The range information can also be used to determine if a person would be in the room if the range is significantly further than previous returns (e.g., the target is outside the room).

A mobile device or smart speaker can include circuitry for performing ranging measurements. Such circuitry can include one or more dedicated antennas (e.g., three antennas) and circuitry for processing measured signals. The ranging measurements can be performed using the time-of-flight of pulses between the mobile device and the smart speaker. In some implementations, a round-trip time (RTT) is used to determine distance information, e.g., for each of the antennas. In other implementations, a single-trip time in one direction can be used. The pulses may be formed using ultra-wideband (UWB) radio technology.

A brief review of ranging and triangulation techniques follows below.

A. Sequence Diagram

Figure 3:
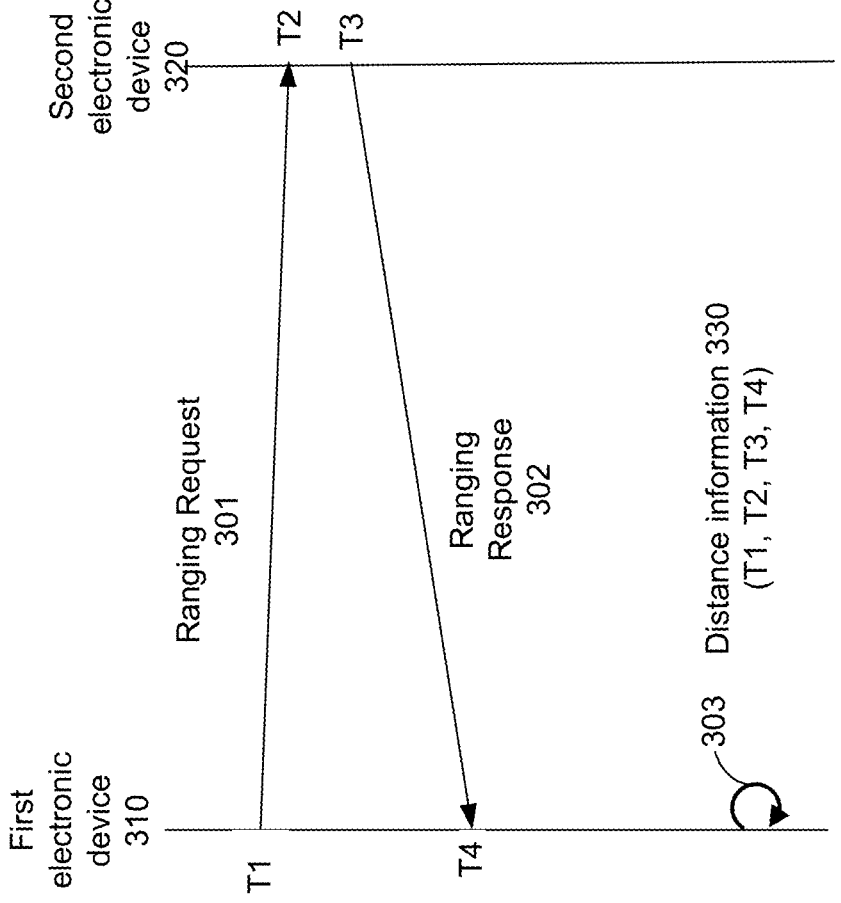
FIG. 3 shows a sequence diagram for performing a ranging measurement between an electronic device and a mobile device according to embodiments of the present disclosure.

FIG. 3 shows a sequence diagram 300 for performing a ranging measurement between an electronic device and a target according to embodiments of the present disclosure. The electronic device and the mobile device may belong to two different users. Although FIG. 3 shows a single measurement, the process can be repeated to perform multiple measurements over a time interval as part of a ranging session, where such measurements can be averaged or otherwise analyzed to provide a single distance value, e.g., for each antenna.

In various embodiments, a more complex exchange can be used. For example, the electronic device can send out a polling message and open up a plurality of response time slots. Inside each response time slot there can be one, two, or three packet exchanges. The additional packet exchanges can correct for ranging errors (e.g., differential clock rates, multipath propagation) in order to generate more accurate relative position (distance/angle).

A first electronic device 310 (e.g., a smart speaker, a smart TV, a smart appliance, etc.) can initiate a ranging measurement (operation) by transmitting a ranging request 301 to a second electronic device 320 (e.g., a mobile device). Ranging request 301 can include a first set of one or more pulses. The ranging measurement can be performed using a ranging wireless protocol (e.g., ultra-wideband (UWB)). The ranging measurement may be triggered in various ways, e.g., based on user input and/or authentication using another wireless protocol, e.g., Bluetooth Low Energy (BLE).

At $T_1$, the first electronic device 310 transmits ranging request 301. At $T_2$, the second electronic device 320 receives ranging request 301. $T_2$ can be an average received time when multiple pulses are in the first set. The second electronic device 320 can be expecting the ranging request 301 within a time window based on previous communications, e.g., using another wireless protocol. The ranging wireless protocol and another wireless protocol can be synchronized so that second electronic device 320 can turn on the ranging antenna(s) and associated circuitry for a specified time window, as opposed to leaving them on for an entire ranging session.

In response to receiving the ranging request 301, second electronic device 320 can transmit ranging response 302. As shown, ranging response 302 is transmitted at time $T_3$, e.g., a transmitted time of a pulse or an average transmission time for a set of pulses. $T_2$ and $T_3$ may also be a set of times for respective pulses. Ranging response 302 can include times $T_2$ and $T_3$ so that the first electronic device 310 can compute distance information. As an alternative, a delta between the two times (e.g., $T_3$-$T_2$) can be sent. The ranging response 302 can also include an identifier for the first electronic device 310, an identifier for the second electronic device 320, or both.

At $T_4$, the first electronic device 310 can receive ranging response 302. Like the other times, $T_4$ can be a single time value or a set of time values.

At 303, the first electronic device 310 computes distance information 330, which can have various units, such as distance units (e.g., meters) or as a time (e.g., milliseconds). Time can be equivalent to a distance with a proportionality factor corresponding to the speed of light. In some embodiments, a distance can be computed from a total round-trip time, which may equal $T_2$-$T_1$+$T_4$-$T_3$. In some embodiments, the processing time for the second electronic device 320 can also be subtracted from the total round-trip time. More complex calculations can also be performed, e.g., when the times correspond to sets of times for sets of pulses and when a frequency correction is implemented. Also, additional packet exchanges can be included to correct for ranging errors such as difference between device clock frequencies.

However, ranging may not be required and may be difficult in certain applications. As the number of participating devices increases the complexity of the ranging sessions also increases due to potential of collisions between ranging packets in the same frequency band. In addition, other ranging techniques can be complicated when one or more mobile devices enter or leave the communication session. In addition, multiple beacons can be used for precise position location of mobile devices with the receiving devices in a passive receive only mode.

The location of the mobile device may be determined using one or more sensors of the mobile device. For example, the mobile device may detect signals emitted from one or more fixed signal sources such as a router, a remote device, a Bluetooth device, and/or the like). One or more properties (e.g., data packet, signal strength, etc.) of each received signal may be used to provide a relative position of the mobile device to the one or more fixed signal sources (despite not knowing the layout of the structure).

B. Triangulation to Determine Angle of Arrival

Figure 4:
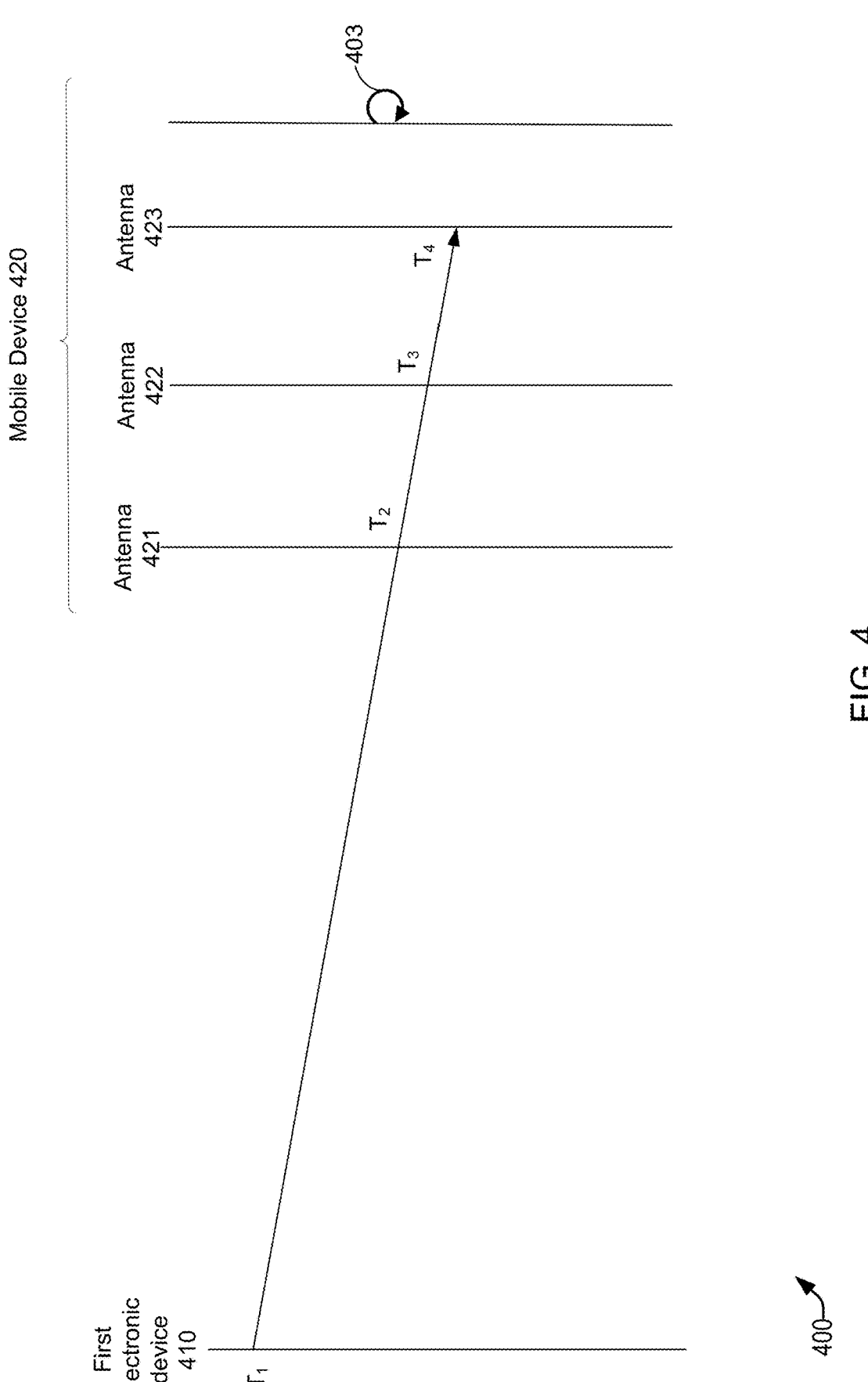
FIG. 4 shows a sequence diagram of a ranging operation involving a first electronic device and a mobile device having three antennas according to embodiments of the present disclosure.

FIG. 4 shows a sequence diagram 400 of a ranging operation involving a first electronic device 410 (e.g., a smart speaker, a smart TV, a smart appliance, etc.) and a mobile device 420 having three antennas 421, 422, and 423 according to embodiments of the present disclosure. Antennas 421, 422, 423 can be arranged to have different orientations, e.g., to define a field of view for calculating angle of arrival or for performing ranging measurements.

In this example of FIG. 4, each of antennas 421, 422, 423 receives a packet (including one or more pulses) that is transmitted by the first electronic device 410 (e.g., a smart speaker, a smart TV, a smart appliance, etc.). These packets can transfer information to the mobile device 420 such as links to information or ranging requests. The link can be received by the mobile device. The reception of the packets can trigger one or more actions on the mobile device 420. The actions can include initiating a hand-off or enabling a user interface on the mobile device 420.

Mobile device 420 can have multiple antennas, which can be used to determine angular information related to an orientation of mobile device 420 relative to first electronic device 410. The packets can be received at times $T_2$, $T_3$, and $T_4$, by antennas 421, 422, and 423, respectively. Thus, the antenna(s) (e.g., UWB antennas) of mobile device 420 can listen at substantially the same time. In various embodiments, each of the antennas 421, 422, and 423 can respond independently.

Processor 424 of mobile device 420 can calculate an angle of arrival to the first electronic device 410. Processor 424 can receive, at 403, the time of arrival of the packets from the antennas 421, 422, and 423. The mobile device 420 circuitry (e.g., UWB circuitry) can analyze the received signals from antennas 421, 422, 423. As described later, processor 424 can be an always-on processor that uses less power than an application processor that can perform functionality that is more general. The processor 424 can know the geometry of the three antennas on the phone. The processor 424 can also know the orientation of the mobile device 420 from one or more sensors on the mobile device 420 (e.g., accelerometer, gyroscope, and compass). With the known orientation of the antennas 421, 422, and 423, and the known orientation of the mobile device 420, the processor can use the times of arrival $T_2$, $T_3$, and $T_4$ to calculate an angle of arrive of the packet to the beacon device 410.

Accordingly, a mobile device can have multiple antennas to perform triangulation. The separate measurements from different antennas can be used to determine a two-dimensional (2D) position, as opposed to a single distance value that could result from anywhere on a circle/sphere around the mobile device. The two-dimensional (2D) position can be specified in various coordinates, e.g., Cartesian, or polar, where polar coordinates can comprise an angular value and a radial value.

Figure 5:
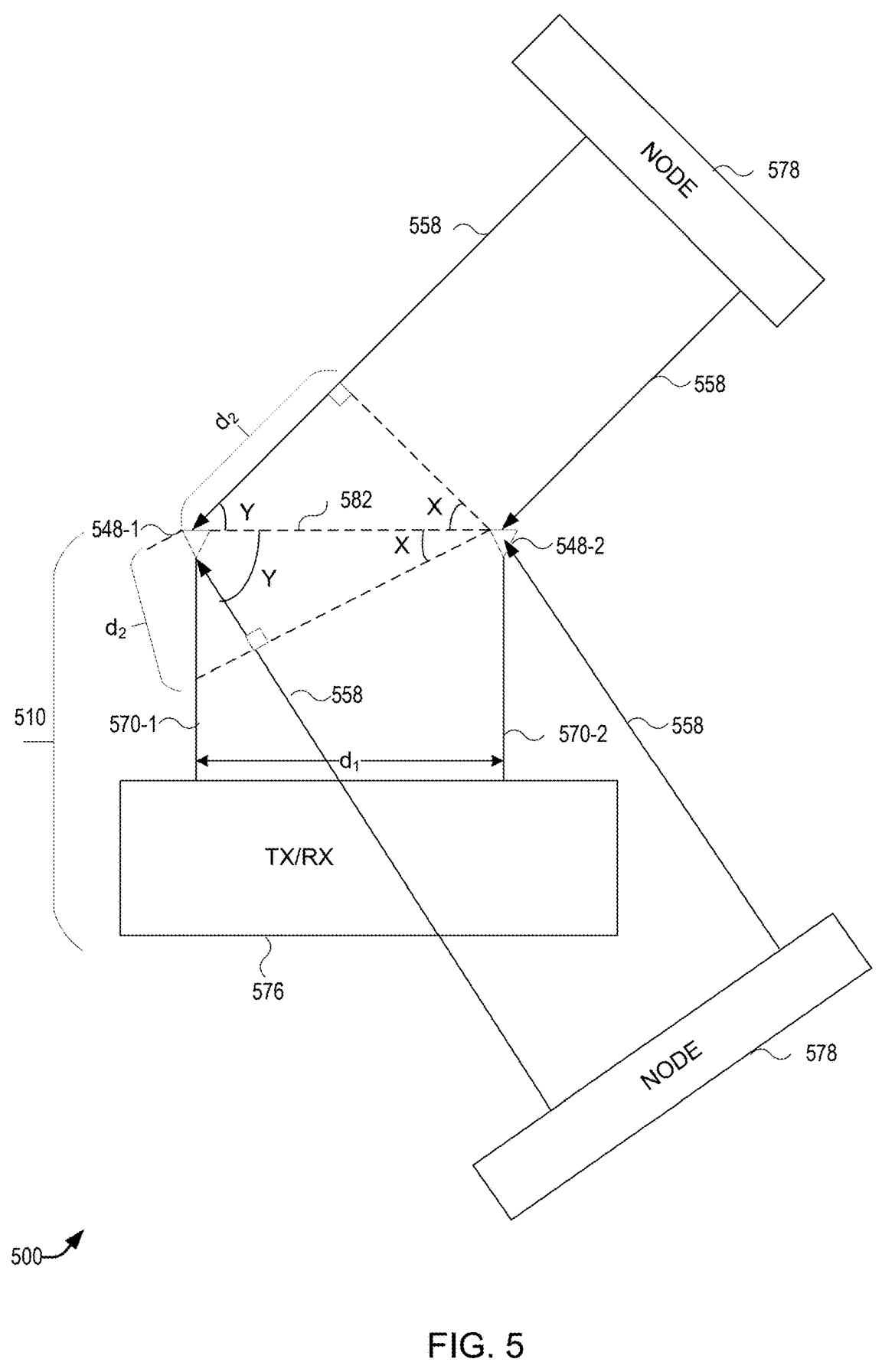

FIG. 5 is a schematic diagram 500 showing how angle of arrival measurement techniques may be used to determine the orientation of device 510 relative to nodes 578. The angle of arrival information can be used to trigger one or more features for the electronic device. For example, a user interface can be generated for controlling the electronic device if the mobile device is pointed at the electronic device. The term "node" may be used to refer to an electronic device, an object without electronics, and/or a particular location. In some arrangements, nodes may be associated with a mapped environment (e.g., the term node may refer to a device, object, or location in a mapped environment). Devices 510 may have control circuitry that determines where other nodes are located relative to device 510. The control circuitry in device 510 may synthesize information from cameras, motion sensors, wireless circuitry such as antennas, and other input-output circuitry to determine how far a node is relative to device 510 and/or to determine the orientation of device 510 relative to that node. The control circuitry may use output components in device 510 to provide output (e.g., display output, audio output, haptic output, or other suitable output) to a user of device 510 based on the position of the node. The control circuitry may, for example, use antenna signals and motion data to determine the angle of arrival of signals from other electronic devices to thereby determine the locations of those electronic devices relative to the user's electronic device.

As shown in FIG. 5, electronic device 510 may include multiple antennas (e.g., a first antenna 548-1 and a second antenna 548-2) coupled to transceiver circuitry 576 by respective transmission lines 570 (e.g., a first transmission line 570-1 and a second transmission line 570-2). Antennas 548-1 and 548-2 may each receive a wireless signal 558 from node 578. Antennas 548-1 and 548-2 may be laterally separated by a distance $d_1$, where antenna 548-1 is farther away from node 578 than 548-2 (in the example of FIG. 5). Therefore, wireless communications signal 558 travels a greater distance to reach antenna 548-1 than 548-2. The additional distance between node 578 and antenna 548-1 is shown in FIG. 5 as distance $d_2$. FIG. 5 also shows angles x and y (where x+y=90°).

Distance $d_2$ may be determined as a function of angle $\gamma$ or angle x (e.g., $d_2 = d_1 \sin(x)$ or $d_2 = d_1 \cos(y)$). Distance $d_2$ may also be determined as a function of the phase difference between the signal received by antenna 548-1 and the signal received by antenna 548-2 (e.g., $d_2 = (\Delta\phi\lambda)/(2\pi)$, where $\Delta\phi$ is the phase difference between the signal received by antenna 548-1 and the signal received by antenna 548-2 and $\lambda$ is the wavelength of the received signal 558). Electronic device 510 may have phase measurement circuitry coupled to each antenna to measure the phase of the received signals and identify a difference in the phases ($\Delta\phi$). The two equations for $d_2$ may be set equal to each other (e.g., $d_1 \sin(x) = (\Delta\phi\lambda)/(2\pi)$) and rearranged to solve for angle x (e.g., $x = \sin(x) - 1$ $(\Delta\phi\lambda)/(2\pi d_1)$) or may be rearranged to solve for angle $\gamma$. As such, the angle of arrival may be determined (e.g., by control circuitry) based on the known (predetermined) distance between antennas 548-1 and 548-2, the detected (measured) phase difference between the signal received by antenna 548-1 and the signal received by antenna 548-2, and the known wavelength or frequency of the received signals 558.

Distance $d_1$ may be selected to ease the calculation for phase difference between the signal received by antenna 548-1 and the signal received by antenna 548-2. For example, $d_1$ may be less than or equal to one-half of the wavelength (e.g., effective wavelength) of the received signal 558 (e.g., to avoid multiple phase difference solutions).

Some antenna arrangements may be sufficient for resolving the "complete" angle of arrival of signals 558 without ambiguity. A complete angle of arrival (sometimes referred to as the direction of arrival) includes an azimuth angle θ and an elevation angle γ of node 578 relative to device 1300.

Antennas that are located in a three-dimensional arrangement (e.g., spanning multiple planes) may be sufficient to determine the complete angle of arrival of signals 558 without ambiguity. However, when the baseline vectors (i.e., the vectors that extend between respective pairs of antennas) are all located in one plane, there may be some ambiguity as to the correct azimuth angle θ and/or the correct elevation angle γ of signals 558. In the two-antenna arrangement of FIG. 5, for example, there is only one baseline vector 582, which yields an accurate, unambiguous azimuth angle θ, but may not provide sufficient information to determine elevation angle φ. Thus, node 578' with a different elevation angle may nonetheless produce signals 558' with the same phase difference Δφ between the signal received by antenna 548-1 and the signal received by antenna 548-2 as signals 558. In other words, different directions of arrival may result in the same phase difference. This leads to an ambiguity in the angle of arrival solution. Without other information, control circuitry may be able to determine the azimuth angle θ of signals 558 but may be unable to determine elevation angle γ of signals 558. Systems with three or more coplanar antennas will resolve some but not all ambiguities in the angle of arrival because the baseline vectors will still be located in the same plane.

To help resolve ambiguities in the complete angle of arrival, control circuitry may combine antenna signals with motion data gathered using motion sensor circuitry. In particular, control circuitry may obtain angle of arrival measurements (e.g., measurements of azimuth angle θ and/or elevation angle φ) while device 510 is in multiple different positions. At each position, antennas 548 may receive signals 558 from node 578 and control circuitry may determine the possible angle of arrival solutions based on the phase difference between signals received by antenna 548-1 and signals received by antenna 548-2. Motion sensor circuitry may track the movement of device 510 as it is moved from one position to another. Using the motion data from motion sensor circuitry, control circuitry may associate each set of angle of arrival solutions with a different baseline vector 582. The baseline vectors may span multiple planes, thus providing sufficient information for control circuitry to determine the correct angle of arrival, just as if device 510 had a multi-planar antenna arrangement.

It should be understood that using a horizontal coordinate system and representing the complete angle of arrival with azimuth and elevation angles is merely illustrative. If desired, a Cartesian coordinate system can be used, and the angle of arrival may be expressed using a unit direction vector that is represented using x, y, and z coordinates. Other coordinate systems may also be used. A horizontal coordinate system is sometimes described herein as an illustrative example.

IV. Triggering Ultrasonic Signal Using Electromagnetic Signal

An electromagnetic signal can detect possible in-room event, which can trigger an ultrasonic signal. In this way, the ultrasonic signal is not always on thereby reducing any adverse effects caused by the use of ultrasonic signals. In addition, or alternatively, the ultrasonic signal can be used as a gold standard to label when an in-room event does occur, and then measurements using an electromagnetic signals (labeled as corresponding to an in-room event) can be used to train a supervised model.

FIG. 6 is a flow chart of a process 600, according to an example of the present disclosure. According to an example, one or more process blocks of FIG. 6 may be performed by an electronic device as described herein. The electronic device can transmit and receive electromagnetic signals and ultrasonic signals.

At block 605, process 600 may include transmitting an electromagnetic wireless signal by an electromagnetic transceiver of the electronic device. For example, the electronic device may transmit an electromagnetic wireless signal by an electromagnetic transceiver of the electronic device, as described above. The electromagnetic signal can be transmitted by a transceiver using one or more antenna on the electronic device. The electromagnetic signal can be a wireless protocol (e.g., UWB, Bluetooth, Wi-Fi, Bluetooth Low Energy etc.). The electronic device can store the transmission time in a memory of the electronic device.

At block 610, process 600 may include receiving, by the electromagnetic transceiver, an electromagnetic signal return from the electromagnetic wireless signal. For example, electronic device 900 may receive, by the electromagnetic transceiver, an electromagnetic signal return from the electromagnetic wireless signal, as described above. The electromagnetic signal can be received by one or more antenna of the electronic device. In the cases of multiple antenna, the antenna can be dispersed on the body of the electronic device. The electronic device can determine the time of reception of the electromagnetic signal. The time of reception of the electromagnetic signal can be stored in a memory of the electronic device.

The electronic device can determine a round-trip time of flight between the transmission time and the reception time of the electronic signal. The electronic device can account for a processing time of the electromagnetic signal when determining the round-trip time. The electromagnetic signal can travel at the speed of light. The electronic device can calculate a range (or a distance from the electronic device to a target (e.g., a person) by multiplying the one-half of the time of flight by the speed of light. The range can be stored in a memory of the electronic device.

At block 615, process 600 may include detecting a potential moving target in the room based on the electromagnetic signal return. For example, electronic device 900 may detect a potential moving target in the room based on the electromagnetic signal return, as described above in Section IA. The electronic device can first determine a baseline using one or more electromagnetic signal returns. The baseline may not include the person. The electromagnetic device may detect subsequent returns after a person enters the room. The electronic device can detect additional electromagnetic signal returns that can correspond to the person. The additional electromagnetic signal returns can be compared to the baseline and used to detect the presence of a person in the room. In various embodiments, the two vector signals can be subtracted and the magnitude of the difference can be compared to a threshold. The electronic device can use one or more of a size, shape, or range of the target to determine whether a person is in the room. For example, the range of the target may exceed the dimensions of the room providing an indication that the target may be outside of the room.

The electronic device can store one or more profiles for potential targets. The electronic device can compare the received signals to the one or more stored profiles for potential targets to determine if a potential mobile target is in the room. In various embodiments, the electronic device can measure the doppler shift of the signal to determine if a target in the room is moving. The location and/or velocity of the target can be stored in a memory of the electronic device.

In various embodiments, process 600 may include detecting the potential mobile target using a passive sensor. In various embodiments, the passive sensor can be a camera (e.g., an IP camera). In various embodiments, the passive sensor can be an infrared sensor. In various embodiments, the sensor can be a vibration sensor. In various embodiments, the sensor can be a thermal sensor.

At block 620, responsive to detecting the potential mobile target, a transmitter of the electronic device can transmit an ultrasonic signal. For example, responsive to detecting the potential mobile target, the electronic device 900 may transmit an ultrasonic signal from a transmitter of the electronic device, as described above. In various embodiments, the transmitter is a speaker of the electronic device. The electronic device can store the transmission time of the ultrasonic signal in the memory of the electronic device.

At block 625, process 600 may include receiving an ultrasonic signal return by a receiver of the electronic device. For example, electronic device 900 may receive an ultrasonic signal return by a receiver of the electronic device, as described above. The electronic device can receive a return of the ultrasonic signal using a receiver. In various embodiments, the receiver of the electronic device is one or more microphones. The ultrasonic signal can be received by one or more microphones of the electronic device. In the cases of multiple microphones, the microphones can be dispersed on the body of the electronic device. The electronic device can determine the time of reception of the ultrasonic signal. The time of reception of the ultrasonic signal can be stored in a memory of the electronic device.

The electronic device can determine a round-trip time of flight between the transmission time and the reception time of the ultrasonic signal. The electronic device can account for a processing time of the ultrasonic signal when determining the round-trip time. The ultrasonic signal can travel at the speed of sound. The electronic device can calculate a range (or a distance from the electronic device to a target (e.g., a person) by multiplying the one-half of the time of flight by the speed of sound. The range can be stored in a memory of the electronic device. The electronic device can measure the doppler shift for the ultrasonic signal returns. The doppler shift can be used to determine a velocity of the potential target. The velocity of the target from the electromagnetic signal can be compared with the velocity of the target from the ultrasonic signal.

At block 630, process 600 may include confirming the potential mobile target is in the room based on the ultrasonic signal return. For example, electronic device 900 may confirm the potential mobile target is in the room based on the ultrasonic signal return, as described above. The electronic device can use one or more of a size, shape, or range of the target to determine whether a person is in the room. For example, the range of the target may significantly different than the baseline measurement thereby providing an indication that the target may be outside of the room. The electronic device can correlate the target based on comparing the range to target determined from the electromagnetic signal and the range determined using the ultrasonic signal. If the electromagnetic signal detects a target and the ultrasonic signal does not, this may be an indication that the target (e.g., a person) is outside the room.

Process 600 may include additional implementations, such as any single implementation or any combination of implementations described below and/or in connection with one or more other processes described elsewhere herein. In a first implementation, the detecting the potential mobile target may include: storing a transmission time of the electromagnetic wireless signal; storing a reception time of the electromagnetic wireless signal; calculating a time of flight based on the transmission time and the reception time; calculating a distance of the potential mobile target based on the time of flight; and comparing the distance based on a library of stored distances for the room.

In various embodiments, process 600 further includes confirming the potential mobile target is outside the room if the distance is outside one or more stored ranges for the room.

In various embodiments, process 600 can include mapping a topography of a room and storing the topography in a memory. In various embodiments, the device can map the topography of the room from the various signal returns around the room. In various embodiments, a user can walk around the limits of the room and be recognized by the electronic device. In various embodiments, the limits can be input from a user through a graphical user interface. In various embodiments, the mapping can be performed without the use of other sensors (e.g., ultrasonic sensors). The process 600 can include transmitting and electronic signal and receiving the electronic response signal by a plurality of antennas at the electronic device. The electronic device can use the plurality of antenna to determine a range and an angle of arrival for the electronic response signal. The range and the angle of arrival of the electronic response signal can be compared with the topography of the room. For example, a person may be standing in a hallway just outside the limits of a room in front of an open door. The range to person from the electronic device may be 6 meters. However, the topography indicates the distance from the device to the door (hence the limit of the room) is only 5 meters. Therefore, the range and angle of the electronic response signal can be compared with the topography of the room to determine if the target is inside or outside of the room.

In various embodiments, the electromagnetic wireless signal is an ultrawideband signal.

In various embodiments, the detecting the potential mobile target may include determining a doppler shift of the electromagnetic signal return to determine motion of the potential mobile target. In principle, the electromagnetic signal can measure the range, angle, and Doppler (radial velocity) of moving objects in a scene. With a chain of detection, clustering and tracking algorithms, a radar point cloud can be obtained to offer the information including location, velocity, and trajectory of objects. The point cloud can be stored in a memory.

It should be noted that while FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

V. Training EM Model Using Signals Labeled
Based on Ultrasonic Detection

The electromagnetic signal returns can be stored in a memory of the electronic device. Overtime, the electromagnetic signal returns can be used to train an electromagnetic model. In various embodiments, one or more second sensors can be used to confirm the presence of a person in the various electromagnetic signal returns. The electromagnetic model can be trained on various electromagnetic signal returns some with confirmed detections and others with confirmed non-detections. The trained electromagnetic model can them be used for subsequent electromagnetic signal returns to detect the presence of the person from the electromagnetic signal returns only. In various embodiments, the electromagnetic model can be accurate enough to detect the presence of a specific person based on the electromagnetic signal returns alone.

FIG. 7 is a flow chart of a process 700, according to an example of the present disclosure. According to an example, one or more process blocks of FIG. 7 may be performed by electronic device 900.

At block 705, process 700 may include transmitting an electromagnetic wireless signal by an electromagnetic transceiver of a first sensor of the electronic device. For example, electronic device 900 may transmit an electromagnetic wireless signal by an electromagnetic transceiver of a first sensor of the electronic device, as described above. The electromagnetic signal can be transmitted by a transceiver using one or more antenna on the electronic device. The electromagnetic signal can be a wireless protocol (e.g., UWB, Bluetooth, Wi-Fi, Bluetooth Low Energy etc.). The electronic device can store the transmission time in a memory of the electronic device.

At block 710, process 700 may include receiving, by the electromagnetic transceiver, an electromagnetic return signal from the electromagnetic wireless signal. For example, electronic device 900 may receive, by the electromagnetic transceiver, an electromagnetic return signal from the electromagnetic wireless signal, as described above. The electromagnetic signal can be received by one or more antenna of the electronic device. In the cases of multiple antenna, the antenna can be dispersed on the body of the electronic device. The electronic device can determine the time of reception of the electromagnetic signal. The time of reception of the electromagnetic signal can be stored in a memory of the electronic device.

The electronic device can determine a round-trip time of flight between the transmission time and the reception time of the electronic signal. The electronic device can account for a processing time of the electromagnetic signal when determining the round-trip time. The electromagnetic signal can travel at the speed of light. The electronic device can calculate a range (or a distance from the electronic device to a target (e.g., a person) by multiplying the one-half of the time of flight by the speed of light. The range can be stored in a memory of the electronic device.

At block 715, process 700 may optionally include detecting a potential target in the room based on the electromagnetic return signal. In various embodiments, the second sensor may be used on its own without a preliminary detection by the electromagnetic signal. For example, electronic device 900 may detect a potential target in the room based on the electromagnetic return signal, as described above. The electronic device can use one or more of a size, shape, or range of the target to determine whether a person is in the room. For example, the range of the target may exceed the dimensions of the room providing an indication that the target may be outside of the room.

The electronic device can use one or more of a size, shape, or range of the target to determine whether a person is in the room. For example, the range of the target may exceed the dimensions of the room providing an indication that the target may be outside of the room.

At block 720, process 700 may include determining that the potential target is in the room using a second sensor. For example, electronic device 900 may determine that the potential target is in the room using a second sensor, as described above. In various embodiments, the second sensor can be an ultrasonic sensor (e.g., a sensor) an infrared sensor, a camera (e.g., an Internet Protocol (IP) camera), or a LIDAR sensor. As examples, a second signal from the second sensor may include an infrared signal and the second sensor may include an infrared sensor.

In various embodiments, the second sensor is initially used for calibrating the model of the room to identify the one or more known targets. For example, the electromagnetic signals can detect various objects around the room (e.g., a chair, a couch, a lamp). If the second sensor is an infrared sensor, these objects can be noted as not targets (since the temperature is the same as the rest of the room). Therefore, the specific location of these targets in the room can form part of the baseline return and can be eliminated as potential targets on subsequent detections.

In various embodiments, the baseline return (e.g., no person present) can be stored in a memory. Subsequent electromagnetic returns can be compared with the baseline return to determine a difference between the returns to indicate the presence of a person in the return.

The electronic device can label and store electromagnetic returns when targets are detected. The electronic device receives numerous returns some of which are confirmed as targets and other that are confirmed as non-targets. After receiving and analyzing numerous electromagnetic returns, the electronic device can determine one or more features that indicate the detection of a target. For example, the size and shape of the electromagnetic returns can be useful in detecting a potential target or non-target. In various embodiments, instead of the electromagnetic returns being used to train the electromagnetic model, the electromagnetic return differences from the baseline can be used to train the electromagnetic model for the detection of targets.

At block 725, process 700 may include responsive to determining the potential target is in the room, saving a training signature of the electromagnetic return signal for training a machine learning model. For example, electronic device 900 may, responsive to determine the potential target is in the room, save a training signature of the electromagnetic return signal for training a machine learning model, as described above. As examples, the training signature can be the difference between a baseline return (with no person) and a subsequent signal or can be the electromagnetic signal returns. The return signals can be converted to a point-cloud. The point-cloud can be stored in a memory of the electronic device.

At block 730, process 700 may include repeating to obtain a set of training signatures identified as corresponding to the potential target being in the room. For example, electronic device 900 may repeat to obtain a set of training signatures identified as corresponding to the potential target being in the room, as described above. The electronic device can repeat steps 705-725 until a predetermined confidence value of certainly of detection or lack of detection can be reached. In some embodiments, the training signature can include cases when no target is in the room. In some embodiments, the training signature can include cases where the target is outside of the room. Based on all these types of cases, the machine learning model can learn the correct decision rule.

At block 735, process 700 may include training, using the set of training signatures, the machine learning model to detect when a target is in the room using the first sensor. For example, electronic device 900 may train, using the set of training signatures, the machine learning model to detect when a target is in the room using the first sensor. The electronic device can use various machine learning techniques to train a model to analyze one or more returns to determine if a target is detected. For example, deep neural networks, convolutional neural networks (CNN), transformer networks, or long short-term memory (LSTM) networks can be used to detect targets from various electromagnetic signal (e.g., radar) return data.

Process 700 may include additional implementations, such as any single implementation or any combination of implementations described below and/or in connection with one or more other processes described elsewhere herein. In a first implementation, a second signal from the second sensor may include an ultrasonic signal and the second sensor may include a microphone.

In various embodiments, process 700 further includes generating a model of the room by exposing the electronic device to one or more known targets; training the model of the room to identify the one or more known targets; and storing the model of the room in a memory.

In various embodiments, process 700 further includes identifying a potential known target from the one or more known targets based on one or more characteristics of the electromagnetic signal return and one or more characteristics of a second signal from the second sensor.

In various embodiments, process 700 further includes receiving an identifier in a wireless signal from a second electronic device associated with the one or more known targets.

In various embodiments, process 700 further includes determining angular information for the one or more known targets from the second sensor; and using the angular information to identify a potential known target from the one or more known targets. For example, the ultrasonic sonar can have various microphones distributed around the outside of the housing of the electronic device. The microphones can receive the ultrasonic returns on the various microphones at different amplitudes. The amplitude of the ultrasonic signal return can be used to determine an angle of arrival of the ultrasonic signal return. The angle of arrival information can be analyzed to determine the possible location of the target or alternatively false targets.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

It should be noted that while FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

VI. Using a Trained Machine Learning Model for Detecting a Target

Figure 8:
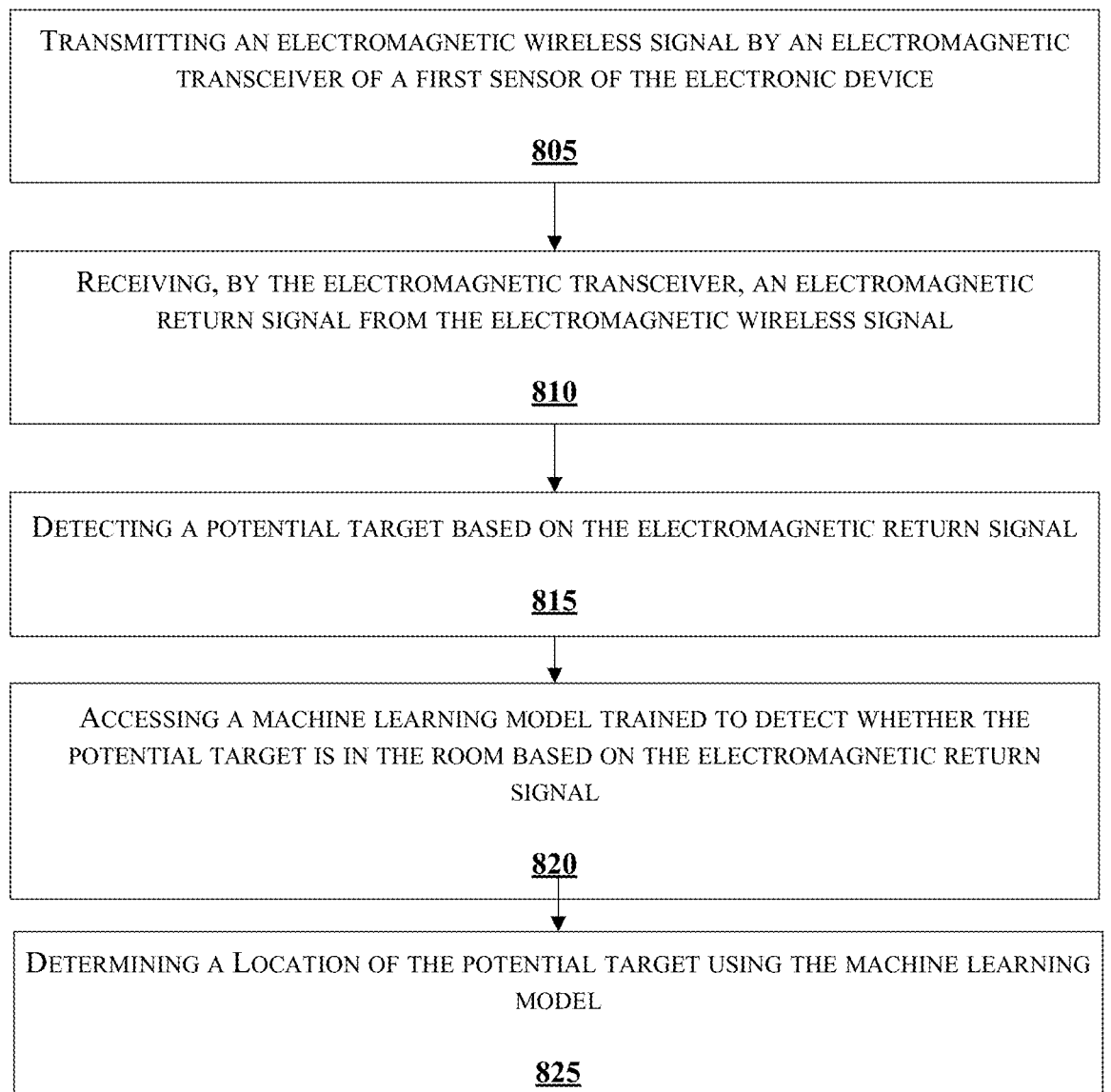
FIG. 8 illustrates a flowchart illustrating a first exemplary technique for detecting a person in a room.

FIG. 8 is a flow chart of a process 800, according to an example of the present disclosure for locating a target using a trained machine learning model. According to an example, one or more process blocks of FIG. 8 may be performed by an electronic device.

At block 805, process 800 may include transmitting an electromagnetic wireless signal by an electromagnetic transceiver of a first sensor of the electronic device. For example, electronic device may transmit an electromagnetic wireless signal by an electromagnetic transceiver of a first sensor of the electronic device, as described above. In various embodiments, the electromagnetic wireless signal is an ultrawideband signal.

At block 810, process 800 may include receiving, by the electromagnetic transceiver, an electromagnetic return signal from the electromagnetic wireless signal. For example, electronic device may receive, by one or more antenna of the electronic device and be processed by the electromagnetic transceiver. The electromagnetic return signal can include one or more properties or characteristics (e.g., frequency, wavelength, signal strength, doppler shift from transmitted signal, etc.)

At block 815, process 800 may include detecting a potential target based on the electromagnetic return signal. For example, electronic device may detect a potential target based on the electromagnetic return signal, as described above.

In various embodiments, the machine learning model compares the electromagnetic signal return to a plurality of labeled electromagnetic signal returns to determine whether the potential target is inside the room targets based on one or more characteristics of the electromagnetic signal return.

At block 820, process 800 may include accessing a machine learning model trained to detect whether the potential target is in the room based on the electromagnetic signal return. For example, electronic device may access a machine learning model trained to detect whether the potential target is in the room based on the electromagnetic signal return, as described above.

At block 825, process 800 may include determining a location of the potential target using the machine learning model. For example, electronic device may determine a location of the potential target using the machine learning model, as described above.

In various embodiments, wherein the machine learning model compares the electromagnetic signal return to a plurality of labeled electromagnetic signal returns to determine whether the potential target is outside of the room targets based on one or more characteristics of the electromagnetic signal return.

In some embodiments, the training signature can include cases when no target is in the room. In some embodiments, the training signature can include cases where the target is outside of the room. Based on all these types of cases, the machine learning model can learn the correct decision rule.

In various embodiments, the process 800 further includes determining angular information for the one or more known targets from the second sensor; and using the angular information to identify a potential known target from the one or more known targets.

It should be noted that while FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

In various embodiments, the detecting the potential target comprises determining a doppler shift of the electromagnetic signal return to determine motion of the potential target.

In various embodiments, the process 800 further includes storing the electromagnetic signal return in a memory of the electronic device.

In various embodiments, an electronic device, can include one or more memories; and one or more processors in communication with the one or more memories and configured to execute instructions stored in the one or more memories of an electronic device in a room to perform operations as described above.

In various embodiments, a non-transitory computer-readable medium storing a plurality of instructions that, when executed by one or more processors of an electronic device, cause the one or more processors to perform operations as described above.

VII. Mobile Device for Performing Ranging

Figure 9:
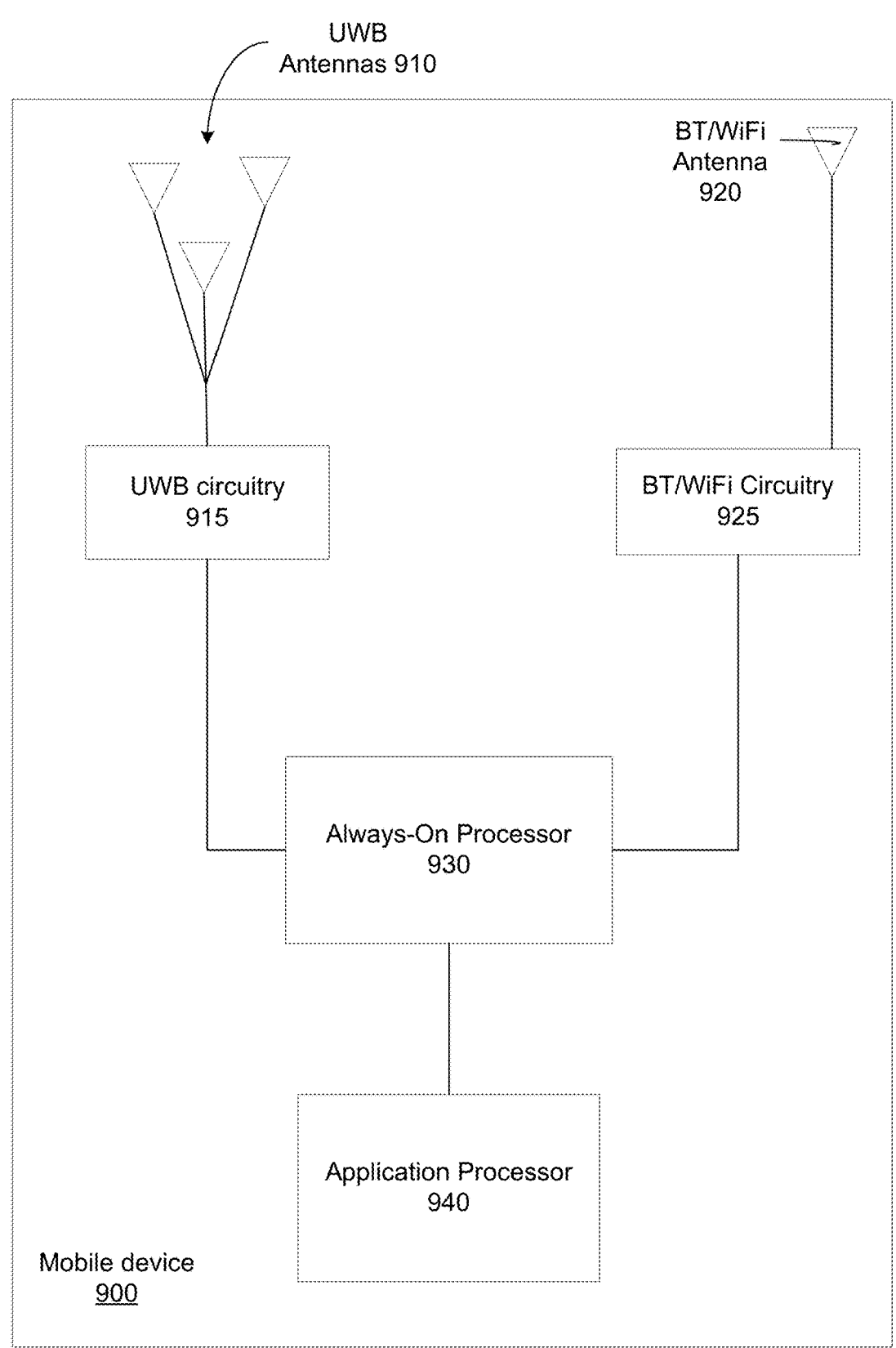
FIG. 9 is a block diagram of components of a mobile device operable to perform ranging according to embodiments of the present disclosure.

FIG. 9 is a block diagram of components of a mobile device 900 operable to perform ranging according to embodiments of the present disclosure. Mobile device 900 includes antennas for at least two different wireless protocols, as described above. The first wireless protocol (e.g., Bluetooth) may be used for authentication and exchanging ranging settings. The second wireless protocol (e.g., UWB) may be used for performing ranging with another mobile device.

As shown, mobile device 900 includes UWB antennas 910 for performing ranging. UWB antennas 910 are connected to UWB circuitry 915 for analyzing detected messages from UWB antennas 910. In some embodiments, mobile device 900 includes three or more UWB antennas, e.g., for performing triangulation. The different UWB antennas can have different orientations, e.g., two in one direction and a third in another direction. The orientations of the UWB antennas can define a field of view for ranging. As an example, the field of view can span 120 degrees. Such regulation can allow a determination of which direction a user is pointing a device relative to one or more other nearby devices. The field of view may include any one or more of pitch, yaw, or roll angles.

UWB circuitry 915 can communicate with an always-on processor (AOP) 930, which can perform further processing using information from UWB messages. For example, AOP 930 can perform the ranging calculations using timing data provided by UWB circuitry 915. AOP 930 and other circuits of the device can include dedicated circuitry and/or configurable circuitry, e.g., via firmware or other software.

As shown, mobile device 900 also includes Bluetooth (BT)/Wi-Fi antenna 920 for communicating data with other devices. BT/Wi-Fi antenna 920 is connected to BT/Wi-Fi circuitry 925 for analyzing detected messages from BT/Wi-Fi antenna 920. For example, BT/Wi-Fi circuitry 925 can parse messages to obtain data (e.g., an authentication tag), which can be sent on to AOP 930. In some embodiments, AOP 930 can perform authentication using an authentication tag. Thus, AOP 930 can store or retrieve a list of authentication tags for which to compare a received tag against, as part of an authentication process. In some implementations, such functionality could be achieved by BT/Wi-Fi circuitry 925.

In other embodiments, UWB circuitry 915 and BT/Wi-Fi circuitry 925 can alternatively or in addition be connected to application processor 940, which can perform similar functionality as AOP 930. Application processor 940 typically requires more power than AOP 930, and thus power can be saved by AOP 930 handling certain functionality, so that application processor 940 can remain in a sleep state, e.g., an off state. As an example, application processor 940 can be used for communicating audio or video using BT/Wi-Fi, while AOP 930 can coordinate transmission of such content and communication between UWB circuitry 915 and BT/Wi-Fi circuitry 925. For instance, AOP 930 can coordinate timing of UWB messages relative to BT advertisements.

To perform ranging, BT/Wi-Fi circuitry 925 can analyze an advertisement message from another device to determine that the other device wants to perform ranging, e.g., as part of a process for sharing content. BT/Wi-Fi circuitry 925 can communicate this notification to AOP 930, which can schedule UWB circuitry 915 to be ready to detect UWB messages from the other device.

For the device initiating ranging, its AOP can perform the ranging calculations. Further, the AOP can monitor changes in distance between the other devices. For example, AOP 930 can compare the distance to a threshold value and provide an alert when the distance exceeds a threshold, or potentially provide a reminder when the two devices become sufficiently close. An example of the former might be when a parent wants to be alerted when a child (and presumably the child's device) is too far away. An example of the latter might be when a person wants to be reminded to bring up something when talking to a user of the other device. Such monitoring by the AOP can reduce power consumption by the application processor.

VIII. Example Device

Figure 10:
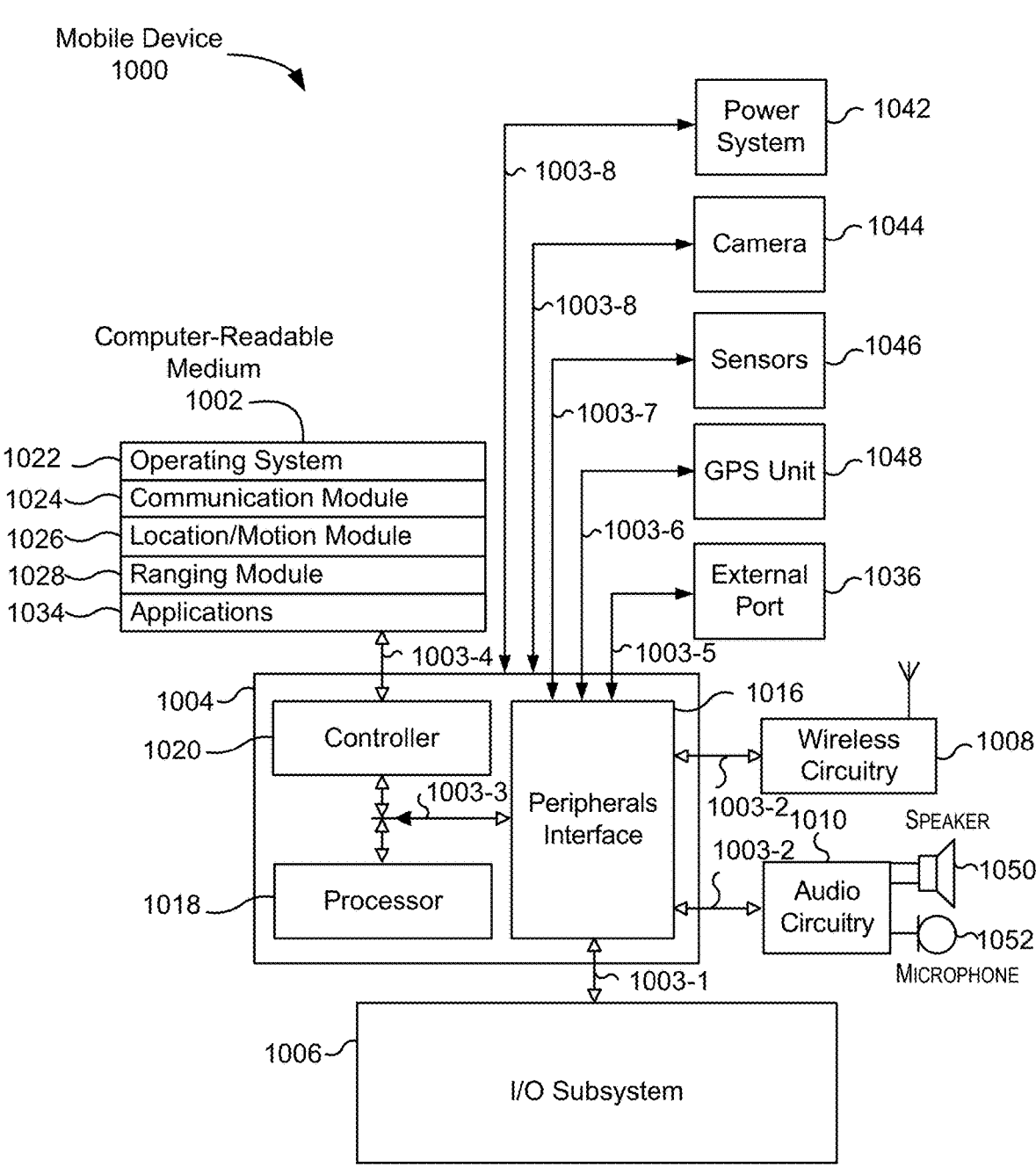
FIG. 10 is block diagram of an example device according to embodiments of the present disclosure.

FIG. 10 is a block diagram of an example electronic device 1000. Device 1000 generally includes computer-readable medium 1002, a processing system 1004, an Input/Output (I/O) subsystem 1006, wireless circuitry 1008, and audio circuitry 1010 including speaker 1012 and microphone 1014. These components may be coupled by one or more communication buses or signal lines 1003. Device 1000 can be any portable electronic device, including a handheld computer, a tablet computer, a mobile phone, laptop computer, tablet device, media player, personal digital assistant (PDA), a key fob, a car key, an access card, a multifunction device, a mobile phone, a portable gaming device, a headset, or the like, including a combination of two or more of these items.

It should be apparent that the architecture shown in FIG. 10 is only one example of an architecture for device 1000, and that device 1000 can have more or fewer components than shown, or a different configuration of components. The various components shown in FIG. 10 can be implemented in hardware, software, or a combination of both hardware and software, including one or more signal processing and/or application specific integrated circuits.

Wireless circuitry 1008 is used to send and receive information over a wireless link or network to one or more other devices' conventional circuitry such as an antenna system, a radio frequency (RF) transceiver, one or more amplifiers, a tuner, one or more oscillators, a digital signal processor, a coder-decoder (CODEC) chipset, memory, etc. Wireless circuitry 1008 can use various protocols, e.g., as described herein. In various embodiments, wireless circuitry 1008 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced (LTE-A), Wi-Fi (such as Institute of Electrical and Electronics Engineers (IEEE) 802.11a, IEEE 802.11b, IEEE 802.11g and/or IEEE 802.11n), Bluetooth, Wi-MAX, Voice Over Internet Protocol (VoIP), near field communication protocol (NFC), a protocol for email, instant messaging, and/or a short message service (SMS), or any other suitable communication protocol, including communication protocols not yet developed as of the filing date of this document.

Wireless circuitry 1008 is coupled to processing system 1004 via peripherals interface 1016. Peripherals interface 1016 can include conventional components for establishing and maintaining communication between peripherals and processing system 1004. Voice and data information received by wireless circuitry 1008 (e.g., in speech recognition or voice command applications) is sent to one or more processors 1018 via peripherals interface 1016. One or more processors 1018 are configurable to process various data formats for one or more application programs 1034 stored on medium 1002.

Peripherals interface 816 couple the input and output peripherals of device 1000 to the one or more processors 1018 and computer-readable medium 1002. One or more processors 1018 communicate with computer-readable medium 1002 via a controller 1020. Computer-readable medium 1002 can be any device or medium that can store code and/or data for use by one or more processors 1018. Computer-readable medium 1002 can include a memory hierarchy, including cache, main memory, and secondary memory. The memory hierarchy can be implemented using any combination of a random-access memory (RAM) (e.g., static random access memory (SRAM) dynamic random access memory (DRAM), double data random access memory (DDRAM)), read only memory (ROM), FLASH, magnetic and/or optical storage devices, such as disk drives, magnetic tape, CDs (compact disks) and DVDs (digital video discs). In some embodiments, peripherals interface 1016, one or more processors 1018, and controller 1020 can be implemented on a single chip, such as processing system 1004. In some other embodiments, they can be implemented on separate chips.

Processor(s) 1018 can include hardware and/or software elements that perform one or more processing functions, such as mathematical operations, logical operations, data manipulation operations, data transfer operations, controlling the reception of user input, controlling output of information to users, or the like. Processor(s) 1018 can be embodied as one or more hardware processors, microprocessors, microcontrollers, field programmable gate arrays (FPGAs), application-specified integrated circuits (ASICs), or the like.

Device 1000 also includes a power system 1042 for powering the various hardware components. Power system 1042 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1000 includes a camera 1044. In some embodiments, device 1000 includes sensors 1046. Sensors can include accelerometers, compass, gyrometer, pressure sensors, audio sensors, light sensors, barometers, and the like. Sensors 1046 can be used to sense location aspects, such as auditory or light signatures of a location.

In some embodiments, device 1000 can include a GPS receiver, sometimes referred to as a GPS unit 1048. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1018 run various software components stored in medium 1002 to perform various functions for device 1000. In some embodiments, the software components include an operating system 1022, a communication module 1024 (or set of instructions), a location module 1026 (or set of instructions), a ranging module 1028 that is used as part of ranging operation described herein, and other application programs 1034 (or set of instructions).

Operating system 1022 can be any suitable operating system, including iOS, Mac OS, Darwin, Real Time Operating System (RTXC), LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 1024 facilitates communication with other devices over one or more external ports 1036 or via wireless circuitry 1008 and includes various software components for handling data received from wireless circuitry 1008 and/or external port 1036. External port 1036 (e.g., universal serial bus (USB), FireWire, Lightning connector, connector, etc.) is adapted for coupling directly to other devices or indirectly over a network (e.g., the Internet, wireless local area network (LAN), etc.).

Location/motion module 1026 can assist in determining the current position (e.g., coordinates or other geographic location identifiers) and motion of device 1000. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 1026 receives data from GPS unit 1048 and analyzes the signals to determine the current position of the mobile device. In some embodiments, location/motion module 1026 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1008 and is passed to location/motion module 1026. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 1000 based on the position coordinates of the corresponding transmitters. Regardless of the specific location technology used, location/motion module 1026 receives information from which a location fix can be derived, interprets that information, and returns location information, such as geographic coordinates, latitude/longitude, or other location fix data Ranging module 1028 can send/receive ranging messages to/from an antenna, e.g., connected to wireless circuitry 1008. The messages can be used for various purposes, e.g., to identify a sending antenna of a device, determine timestamps of messages to determine a distance of a target from another device. Ranging module 1028 can exist on various processors of the device, e.g., an always-on processor (AOP), a UWB chip, and/or an application processor. For example, parts of ranging module 1028 can determine a distance on an AOP, and another part of the ranging module can interact with a sharing module, e.g., to display a position of the other device on a screen in order for a user to select the other device to share a data item. Ranging module 1028 can also interact with a reminder module that can provide an alert based on a distance from another mobile device.

The one or more applications 1034 on device 1000 can include any applications installed on the device 1000, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating, and displaying graphical objects (including without limitation text, web pages, icons, digital images, animations, and the like) on a display surface. In another example, a timer module can be a software timer. The timer module can also be implemented in hardware. The time module can maintain various timers for any number of events.

I/O subsystem 1006 can be coupled to a display system (not shown), which can be a touch-sensitive display. The display displays visual output to the user in a graphical user interface (GUI). The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1006 can include a display and user input devices such as a keyboard, mouse, and/or trackpad. In some embodiments, I/O subsystem 1006 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 1002) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 1006 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1000 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display, or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application, may be implemented as software code to be executed by a processor using any suitable computer language such as, for example, Java, C++, or Perl using, for example, conventional or object-oriented techniques. The software code may be stored as a series of instructions, or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g., a hard drive or an entire computer system), and may be present on or within different computer program products within a system or network. A computer system may include a monitor, printer, or other suitable display for providing any of the results mentioned herein to a user.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g., a solid-state drive, a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering, sharing, and use of data, including an authentication tag and data from which the tag is derived. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to authenticate another device, and vice versa to control which devices ranging operations may be performed. Further, other uses for personal information data that benefit the user are also contemplated by the present disclosure. For instance, health and fitness data may be shared to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing content and performing ranging, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

As used below, any reference to a series of examples is to be understood as a reference to each of those examples disjunctively (e.g., "Examples 1-4" is to be understood as "Examples 1, 2, 3, or 4").

Example 1 is a method performed by an electronic device in a room, the method comprising: transmitting an electromagnetic wireless signal by an electromagnetic transceiver of the electronic device; receiving, by the electromagnetic transceiver, an electromagnetic signal return from the electromagnetic wireless signal; detecting a potential mobile target based on the electromagnetic signal return; responsive to detecting the potential mobile target, transmitting an ultrasonic signal from a transmitter of the electronic device; receiving an ultrasonic signal return by a receiver of the electronic device; and confirming the potential mobile target is in the room based on the ultrasonic signal return.

Example 2 is the method of example(s) 1, wherein the detecting the potential mobile target comprises: storing a transmission time of the electromagnetic wireless signal; storing a reception time of the electromagnetic wireless signal; calculating a time of flight based on the transmission time and the reception time; calculating a distance of the potential mobile target based on the time of flight; and comparing the distance based on a library of stored distances for the room.

Example 3 is the method of example(s) 2, further comprising: confirming the potential mobile target is outside the room if the distance is outside one or more stored ranges for the room.

Example 4 is the method of example(s) 1, wherein the transmitter is a speaker of the electronic device, and the receiver of the electronic device is a microphone.

Example 5 is the method of example(s) 1, wherein the electromagnetic wireless signal is an ultrawideband signal.

Example 6 is the method of example(s) 1, wherein the detecting the potential mobile target comprises determining a doppler shift of the electromagnetic signal return to determine motion of the potential mobile target.

Example 7 is the method of example(s) 1, further comprising detecting the potential mobile target using a passive sensor.

Example 8 is an electronic device, comprising: one or more memories; and one or more processors in communication with the one or more memories and configured to execute instructions stored in the one or more memories to performing operations comprising: transmitting an electromagnetic wireless signal by an electromagnetic transceiver of the electronic device; receiving, by the electromagnetic transceiver, an electromagnetic signal return from the electromagnetic wireless signal; detecting a potential mobile target based on the electromagnetic signal return; responsive to detecting the potential mobile target, transmitting an ultrasonic signal from a transmitter of the electronic device; receiving an ultrasonic signal return by a receiver of the electronic device; and confirming the potential mobile target is in a room based on the ultrasonic signal return.

Example 9 is the electronic device of example(s) 8, wherein the detecting the potential mobile target comprises: storing a transmission time of the electromagnetic wireless signal; storing a reception time of the electromagnetic wireless signal; calculating a time of flight based on the transmission time and the reception time; calculating a distance of the potential mobile target based on the time of flight; and comparing the distance based on a library of stored distances for the room.

Example 10 is the electronic device of example(s) 9, wherein the operations further comprise confirming the potential mobile target is outside the room if the distance is outside one or more stored ranges for the room.

Example 11 is the electronic device of example(s) 8, wherein the transmitter is a speaker of the electronic device, and the receiver of the electronic device is a microphone.

Example 12 is the electronic device of example(s) 8, wherein the electromagnetic wireless signal is an ultrawideband signal.

Example 13 is the electronic device of example(s) 8, wherein the detecting the potential mobile target comprises determining a doppler shift of the electromagnetic signal return to determine motion of the potential mobile target.

Example 14 is the electronic device of example(s) 8, wherein the operations further comprise detecting the potential mobile target using a passive sensor.

Example 15 is a non-transitory computer-readable medium storing a plurality of instructions that, when executed by one or more processors of an electronic device, cause the one or more processors to perform operations comprising: transmitting an electromagnetic wireless signal by an electromagnetic transceiver of the electronic device; receiving, by the electromagnetic transceiver, an electromagnetic signal return from the electromagnetic wireless signal; detecting a potential mobile target based on the electromagnetic signal return; responsive to detecting the potential mobile target, transmitting an ultrasonic signal from a transmitter of the electronic device; receiving an ultrasonic signal return by a receiver of the electronic device; and confirming the potential mobile target is in a room based on the ultrasonic signal return.

Example 16 is the non-transitory computer-readable medium of example(s) 15, wherein the detecting the potential mobile target comprises: storing a transmission time of the electromagnetic wireless signal; storing a reception time of the electromagnetic wireless signal; calculating a time of flight based on the transmission time and the reception time; calculating a distance of the potential mobile target based on the time of flight; and comparing the distance based on a library of stored distances for the room.

Example 17 is the non-transitory computer-readable medium of example(s) 16, wherein the operations further comprise confirming the potential mobile target is outside the room if the distance is outside one or more stored ranges for the room.

Example 18 is the non-transitory computer-readable medium of example(s) 15, wherein the transmitter is a speaker of the electronic device, and the receiver of the electronic device is a microphone.

Example 19 is the non-transitory computer-readable medium of example(s) 15, wherein the electromagnetic wireless signal is an ultrawideband signal.

Example 20 is the non-transitory computer-readable medium of example(s) 15, wherein the detecting the potential mobile target comprises determining a doppler shift of the electromagnetic signal return to determine motion of the potential mobile target.

Example 21 is a method performed by an electronic device in a room, the method comprising: transmitting an electromagnetic wireless signal by an electromagnetic transceiver of a first sensor of the electronic device; receiving, by the electromagnetic transceiver, an electromagnetic return signal from the electromagnetic wireless signal; detecting a potential target in the room based on the electromagnetic return signal; determining that the potential target is in the room using a second sensor; responsive to determining the potential target is in the room, saving a training signature of the electromagnetic return signal for training a machine learning model; repeating to obtain a set of training signatures identified as corresponding to the potential target being in the room; and training, using the set of training signatures, the machine learning model to detect when a target is in the room using the first sensor.

Example 22 is the method of example(s) 21, wherein a second signal from the second sensor comprises an ultrasonic signal and the second sensor comprises a microphone.

Example 23 is the method of example(s) 21, wherein a second signal from the second sensor comprises an infrared signal and the second sensor comprises an infrared sensor.

Example 24 is the method of example(s) 21, wherein the second sensor comprises a camera.

Example 25 is the method of example(s) 21, further comprising: generating a model of the room by exposing the electronic device to one or more known targets; training the model of the room to identify the one or more known targets; and storing the model of the room in a memory.

Example 26 is the method of example(s) 25, further comprising: identifying a potential known target from the one or more known targets based on one or more characteristics of the electromagnetic signal return and one or more characteristics of a second signal from the second sensor.

Example 27 is the method of example(s) 25, wherein the second sensor is initially used for calibrating the model of the room to identify the one or more known targets.

Example 28 is the method of example(s) 25, further comprising receiving an identifier in a wireless signal from a second electronic device associated with the one or more known targets.

Example 29 is the method of example(s) 25, further comprising: determining angular information for the one or more known targets from the second sensor; and using the angular information to identify a potential known target from the one or more known targets.

Example 30 is a computing device, comprising: one or more memories; and one or more processors in communication with the one or more memories and configured to execute instructions stored in the one or more memories of an electronic device in a room to perform operations comprising: transmitting an electromagnetic wireless signal by an electromagnetic transceiver of a first sensor of the electronic device; receiving, by the electromagnetic transceiver, an electromagnetic return signal from the electromagnetic wireless signal; detecting a potential target in the room based on the electromagnetic return signal; determining that the potential target is in the room using a second sensor; responsive to determining the potential target is in the room, saving a training signature of the electromagnetic return signal for training a machine learning model; repeating to obtain a set of training signatures identified as corresponding to the potential target being in the room; and training, using the set of training signatures, the machine learning model to detect when a target is in the room using the first sensor.

Example 31 is the computing device of example(s) 30, wherein a second signal from the second sensor comprises an ultrasonic signal and the second sensor comprises a microphone.

Example 32 is the computing device of example(s) 30, wherein a second signal from the second sensor comprises an infrared signal and the second sensor comprises an infrared sensor.

Example 33 is the computing device of example(s) 30, wherein the second sensor comprises a camera.

Example 34 is the computing device of example(s) 30, wherein the operations further comprise: generating a model of the room by exposing the electronic device to one or more known targets; training the model of the room to identify the one or more known targets; and storing the model of the room in a memory.

Example 35 is the computing device of example(s) 34, wherein the operations further comprise identifying a potential known target from the one or more known targets based on one or more characteristics of the electromagnetic signal return and one or more characteristics of a second signal from the second sensor.

Example 36 is the computing device of example(s) 34, wherein the second sensor is initially used for calibrating the model of the room to identify the one or more known targets.

Example 37 is the computing device of example(s) 34, wherein the operations further comprise receiving an identifier in a wireless signal from a second electronic device associated with the one or more known targets.

Example 38 is the computing device of example(s) 34, wherein the operations further comprise: determining angular information for the one or more known targets from the second sensor; and using the angular information to identify a potential known target from the one or more known targets.

Example 39 is a non-transitory computer-readable medium storing a plurality of instructions that, when executed by one or more processors of an electronic device, cause the one or more processors to perform operations comprising: transmitting an electromagnetic wireless signal by an electromagnetic transceiver of a first sensor of the electronic device; receiving, by the electromagnetic transceiver, an electromagnetic return signal from the electromagnetic wireless signal; detecting a potential target in a room based on the electromagnetic return signal; determining that the potential target is in the room using a second sensor; responsive to determining the potential target is in the room, saving a training signature of the electromagnetic return signal for training a machine learning model; repeating to obtain a set of training signatures identified as corresponding to the potential target being in the room; and training, using the set of training signatures, the machine learning model to detect when a target is in the room using the first sensor.

Example 40 is the non-transitory computer-readable medium of example(s) 39, wherein a second signal from the second sensor comprises an ultrasonic signal and the second sensor comprises a microphone.

Example 41 is the non-transitory computer-readable medium of example(s) 39, wherein a second signal from the second sensor comprises an infrared signal and the second sensor comprises an infrared sensor.

Example 42 is the non-transitory computer-readable medium of example(s) 39, wherein the second sensor comprises a camera.

Example 43 is the non-transitory computer-readable medium of example(s) 39, wherein the operations further comprise: generating a model of the room by exposing the electronic device to one or more known targets; training the model of the room to identify the one or more known targets; and storing the model of the room in a memory.

Example 44 is the non-transitory computer-readable medium of example(s) 43, wherein the operations further comprise identifying a potential known target from the one or more known targets based on one or more characteristics of the electromagnetic signal return and one or more characteristics of a second signal from the second sensor.

Example 45 is the non-transitory computer-readable medium of example(s) 43, wherein the second sensor is initially used for calibrating the model of the room to identify the one or more known targets.

Example 46 is the non-transitory computer-readable medium of example(s) 43, wherein the operations further comprise receiving an identifier in a wireless signal from a second electronic device associated with the one or more known targets.

Example 47 is the non-transitory computer-readable medium of example(s) 43, the operations further comprise: determining angular information for the one or more known targets from the second sensor; and using the angular information to identify a potential known target from the one or more known targets.

Example 48 is a method performed by an electronic device in a room, the method comprising: transmitting an electromagnetic wireless signal by an electromagnetic transceiver of a first sensor of the electronic device; receiving, by the electromagnetic transceiver, an electromagnetic return signal from the electromagnetic wireless signal; detecting a potential target based on the electromagnetic return signal; and accessing a machine learning model trained to detect whether the potential target is in the room based on the electromagnetic signal return; and determining a location of the potential target using the machine learning model.

Example 49 is the method of example(s) 48, wherein the electromagnetic wireless signal is an ultrawideband signal.

Example 50 is the method of example(s) 48, wherein the detecting the potential target comprises determining a doppler shift of the electromagnetic signal return to determine motion of the potential target.

Example 51 is the method of example(s) 48, wherein the machine learning model compares the electromagnetic signal return to a plurality of labeled electromagnetic signal returns to determine whether the potential target is inside the room targets based on one or more characteristics of the electromagnetic signal return.

Example 52 is the method of example(s) 48, wherein the machine learning model compares the electromagnetic signal return to a plurality of labeled electromagnetic signal returns to determine whether the potential target is outside of the room targets based on one or more characteristics of the electromagnetic signal return.

Example 53 is the method of example(s) 48, further comprising: determining angular information for the one or more known targets from a second sensor; and using the angular information to identify a potential known target from the one or more known targets.

Example 54 is the method of example(s) 48, further comprising: storing the electromagnetic signal return in a memory of the electronic device.

Example 55 is an electronic device, comprising: one or more memories; and one or more processors in communication with the one or more memories and configured to execute instructions stored in the one or more memories of an electronic device in a room to perform operations comprising: transmitting an electromagnetic wireless signal by an electromagnetic transceiver of a first sensor of the electronic device; receiving, by the electromagnetic transceiver, an electromagnetic return signal from the electromagnetic wireless signal; detecting a potential target based on the electromagnetic return signal; and accessing a machine learning model trained to detect whether the potential target is in the room based on the electromagnetic signal return; and determining a location of the potential target using the machine learning model.

Example 56 is the electronic device of example(s) 55, wherein the electromagnetic wireless signal is an ultrawideband signal.

Example 57 is the electronic device of example(s) 55, wherein the detecting the potential target comprises determining a doppler shift of the electromagnetic signal return to determine motion of the potential target.

Example 58 is the electronic device of example(s) 55, wherein the machine learning model compares the electromagnetic signal return to a plurality of labeled electromagnetic signal returns to determine whether the potential target is inside the room targets based on one or more characteristics of the electromagnetic signal return.

Example 59 is the electronic device of example(s) 55, wherein the machine learning model compares the electromagnetic signal return to a plurality of labeled electromagnetic signal returns to determine whether the potential target is outside of the room targets based on one or more characteristics of the electromagnetic signal return.

Example 60 is the electronic device of example(s) 55, wherein the operations further comprise: determining angular information for the one or more known targets from a second sensor; and using the angular information to identify a potential known target from the one or more known targets.

Example 61 is the electronic device of example(s) 55, wherein the operations further comprise storing the electromagnetic signal return in a memory of the electronic device.

Example 62 is a non-transitory computer-readable medium storing a plurality of instructions that, when executed by one or more processors of an electronic device, cause the one or more processors to perform operations comprising: transmitting an electromagnetic wireless signal by an electromagnetic transceiver of a first sensor of the electronic device; receiving, by the electromagnetic transceiver, an electromagnetic return signal from the electromagnetic wireless signal; detecting a potential target based on the electromagnetic return signal; and accessing a machine learning model trained to detect whether the potential target is in a room based on the electromagnetic signal return; and determining a location of the potential target using the machine learning model.

Example 63 is the non-transitory computer-readable medium of example(s) 62, wherein the electromagnetic wireless signal is an ultrawideband signal.

Example 64 is the non-transitory computer-readable medium of example(s) 62, wherein the detecting the potential target comprises determining a doppler shift of the electromagnetic signal return to determine motion of the potential target.

Example 65 is the non-transitory computer-readable medium of example(s) 62, wherein the machine learning model compares the electromagnetic signal return to a plurality of labeled electromagnetic signal returns to determine whether the potential target is inside the room targets based on one or more characteristics of the electromagnetic signal return.

Example 66 is the non-transitory computer-readable medium of example(s) 62, wherein the machine learning model compares the electromagnetic signal return to a plurality of labeled electromagnetic signal returns to determine whether the potential target is outside of the room targets based on one or more characteristics of the electromagnetic signal return.

Example 67 is the non-transitory computer-readable medium of example(s) 62, wherein the operations further comprise: determining angular information for the one or more known targets from a second sensor; and using the angular information to identify a potential known target from the one or more known targets.

Example 68 is the non-transitory computer-readable medium of example(s) 62, wherein the operations further comprise storing the electromagnetic signal return in a memory of the electronic device.

Although the present disclosure has been described with respect to specific embodiments, it will be appreciated that the disclosure is intended to cover all modifications and equivalents within the scope of the following claims.

All patents, patent applications, publications, and descriptions mentioned herein are incorporated by reference in their entirety for all purposes. None is admitted being prior art.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The specific details of particular embodiments may be combined in any suitable manner or varied from those shown and described herein without departing from the spirit and scope of embodiments of the invention.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

All references, including publications, patent applications, and patents, cited herein are hereby incorporated by reference to the same extent as if each reference were individually and specifically indicated to be incorporated by reference and were set forth in its entirety herein.

What is claimed is:

1. A method performed by an electronic device in a room, the method comprising:

transmitting an electromagnetic wireless signal by an electromagnetic transceiver of a first sensor of the electronic device;

receiving, by the electromagnetic transceiver, an electromagnetic return signal from the electromagnetic wireless signal;

detecting a potential target in the room based on the electromagnetic return signal;

determining that the potential target is in the room using a second sensor;

responsive to determining the potential target is in the room, saving a training signature of the electromagnetic return signal for training a machine learning model;

repeating to obtain a set of training signatures identified as corresponding to the potential target being in the room; and training, using the set of training signatures, the machine learning model to detect when a target is in the room using the first sensor.

2. The method of claim 1, wherein a second signal from the second sensor comprises an ultrasonic signal and the second sensor comprises a microphone.

3. The method of claim 1, wherein a second signal from the second sensor comprises an infrared signal and the second sensor comprises an infrared sensor.

4. The method of claim 1, wherein the second sensor comprises a camera.

5. The method of claim 1, further comprising:

generating a model of the room by exposing the electronic device to one or more known targets;

training the model of the room to identify the one or more known targets; and storing the model of the room in a memory.

6. The method of claim 5, further comprising:

identifying a potential known target from the one or more known targets based on one or more characteristics of the electromagnetic signal return and one or more characteristics of a second signal from the second sensor.

7. The method of claim 5, wherein the second sensor is initially used for calibrating the model of the room to identify the one or more known targets.

8. The method of claim 5, further comprising:

receiving an identifier in a wireless signal from a second electronic device associated with the one or more known targets.

9. The method of claim 5, further comprising:

determining angular information for the one or more known targets from the second sensor; and using the angular information to identify a potential known target from the one or more known targets.

10. A computing device, comprising:

one or more memories; and one or more processors in communication with the one or more memories and configured to execute instructions stored in the one or more memories of an electronic device in a room to perform operations comprising:

transmitting an electromagnetic wireless signal by an electromagnetic transceiver of a first sensor of the electronic device;

receiving, by the electromagnetic transceiver, an electromagnetic return signal from the electromagnetic wireless signal;

detecting a potential target in the room based on the electromagnetic return signal;

determining that the potential target is in the room using a second sensor;

responsive to determining the potential target is in the room, saving a training signature of the electromagnetic return signal for training a machine learning model;

repeating to obtain a set of training signatures identified as corresponding to the potential target being in the room; and training, using the set of training signatures, the machine learning model to detect when a target is in the room using the first sensor.

11. The computing device of claim 10, wherein a second signal from the second sensor comprises an ultrasonic signal and the second sensor comprises a microphone.

12. The computing device of claim 10, wherein a second signal from the second sensor comprises an infrared signal and the second sensor comprises an infrared sensor.

13. The computing device of claim 10, wherein the second sensor comprises a camera.

14. The computing device of claim 10, wherein the operations further comprise:

generating a model of the room by exposing the electronic device to one or more known targets;

training the model of the room to identify the one or more known targets; and storing the model of the room in a memory.

15. The computing device of claim 10, wherein the operations further comprise: identifying a potential known target from the one or more known targets based on one or more characteristics of the electromagnetic signal return and one or more characteristics of a second signal from the second sensor.

16. The computing device of claim 15, wherein the second sensor is initially used for calibrating the model of the room to identify the one or more known targets.

17. The computing device of claim 15, wherein the operations further comprise:

receiving an identifier in a wireless signal from a second electronic device associated with the one or more known targets.

18. The computing device of claim 15, wherein the operations further comprise:

determining angular information for the one or more known targets from the second sensor; and using the angular information to identify a potential known target from the one or more known targets.

19. A computer-readable medium storing a plurality of instructions that, when executed by one or more processors of a computing device, cause the one or more processors to perform operations comprising:

transmitting an electromagnetic wireless signal by an electromagnetic transceiver of a first sensor of the computing device;

receiving, by the electromagnetic transceiver, an electromagnetic return signal from the electromagnetic wireless signal;

detecting a potential target in the room based on the electromagnetic return signal;

determining that the potential target is in the room using a second sensor;

responsive to determining the potential target is in the room, saving a training signature of the electromagnetic return signal for training a machine learning model;

repeating to obtain a set of training signatures identified as corresponding to the potential target being in the room; and training, using the set of training signatures, the machine learning model to detect when a target is in the room using the first sensor.

20. The non-transitory computer-readable medium of claim 19, wherein the wherein a second signal from the second sensor comprises an ultrasonic signal and the second sensor comprises a microphone.

* * * * *